(12) United States Patent
Saito

(10) Patent No.: US 11,131,846 B2
(45) Date of Patent: Sep. 28, 2021

(54) SINGLE-AXIS ROTARY ACTUATOR

(71) Applicant: Masahiro Saito, Tokyo (JP)

(72) Inventor: Masahiro Saito, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 536 days.

(21) Appl. No.: 16/091,557

(22) PCT Filed: Mar. 31, 2017

(86) PCT No.: PCT/JP2017/013530
§ 371 (c)(1),
(2) Date: Oct. 5, 2018

(87) PCT Pub. No.: WO2017/175672
PCT Pub. Date: Oct. 12, 2017

(65) Prior Publication Data
US 2019/0107712 A1    Apr. 11, 2019

(30) Foreign Application Priority Data

Apr. 5, 2016  (JP) .............................. JP2016-075893

(51) Int. Cl.
*G02B 26/08* (2006.01)
*G01J 3/18* (2006.01)
(Continued)

(52) U.S. Cl.
CPC .......... *G02B 26/0808* (2013.01); *G01J 3/021* (2013.01); *G01J 3/0202* (2013.01);
(Continued)

(58) Field of Classification Search
CPC .. G01J 2003/064; G01J 3/0202; G01J 3/0291; G01J 3/10; G01J 3/18; G01J 3/06; G02B 26/0808; G02B 26/105
See application file for complete search history.

(56) References Cited

U.S. PATENT DOCUMENTS 5,220,550 A    6/1993  Nakayama
8,537,448 B2 *  9/2013  Yamada ............... G02B 26/085
                                                       359/199.3
(Continued)

FOREIGN PATENT DOCUMENTS

JP    2009-085947 A    4/2009
JP    2014-157015 A    8/2014
WO    2011/007628 A1   1/2011

OTHER PUBLICATIONS

International Search Report from International Application No. PCT/JP2017/013530 dated Jun. 20, 2017.

*Primary Examiner* — Maurice C Smith
(74) *Attorney, Agent, or Firm* — Brundidge & Stanger, P.C.

(57) ABSTRACT

Provided is a single-axis rotary actuator that is suitable for rotationally driving an optical element, such as a diffraction grating, in a single-axis direction and that is suitable for forming light having a wide wavelength band. An actuator (500) includes a holder (550) having a mounting surface on which a diffraction grating (401) is attached and a rotary shaft (552); a fixed unit (520) having a bearing that holds the rotary shaft (552) of the holder (550); an elastic member (530) formed of an outer circumferential section fixed on the fixed unit (520), an inner circumferential section fixed on the holder (550), and an arm section interconnecting the outer circumferential section and the inner circumferential section and having elasticity; and a driving unit having a coil (540) provided on the holder (550) and a magnet (510) provided on the fixed unit (520).

1 Claim, 28 Drawing Sheets

(51) Int. Cl.
*G01J 3/06* (2006.01)
*G01J 3/32* (2006.01)
*G01J 3/10* (2006.01)
*G01J 3/02* (2006.01)

(52) U.S. Cl.
CPC .............. *G01J 3/0291* (2013.01); *G01J 3/06* (2013.01); *G01J 3/10* (2013.01); *G01J 3/18* (2013.01); *G01J 3/32* (2013.01); *G01J 2003/064* (2013.01)

(56) References Cited

U.S. PATENT DOCUMENTS

| | | |
|---|---|---|
| 2008/0169891 A1* | 7/2008 | Umeda .................. G02B 7/003 335/229 |
| 2008/0304017 A1 | 12/2008 | Chen et al. |
| 2009/0103577 A1 | 4/2009 | Maeno et al. |
| 2009/0310198 A1 | 12/2009 | Woo |
| 2010/0073750 A1* | 3/2010 | Yamaguchi ........... G01S 7/4816 359/200.7 |
| 2012/0127551 A1 | 5/2012 | Eto et al. |
| 2014/0247440 A1* | 9/2014 | Yamada .................. G01S 17/06 356/5.01 |

* cited by examiner

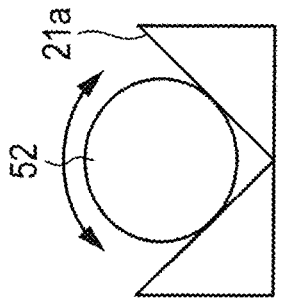
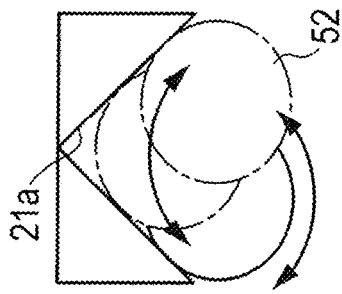
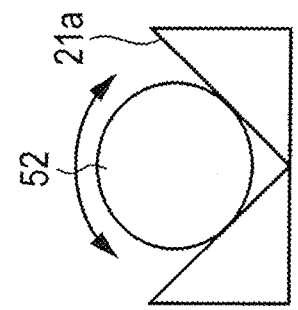
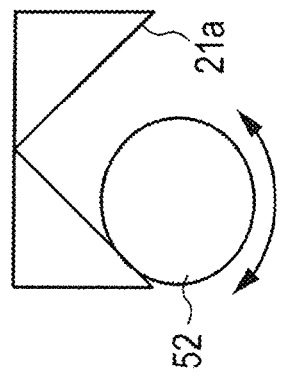
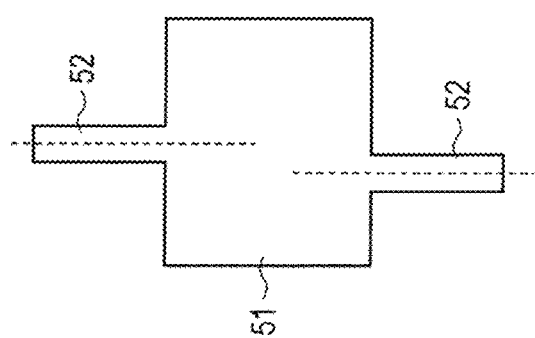

SINGLE-AXIS ROTARY ACTUATOR

TECHNICAL FIELD

The present invention relates to a single-axis rotary actuator for rotationally driving an optical device such as a diffraction grating in the single-axis direction.

BACKGROUND ART

In a monochromator, a diffraction grating is rotationally driven by an actuator, so that the wavelength of light that reaches a slit is changed. As this actuator, a stepping motor, a sine bar mechanism, or the like is mostly used.

An example of the actuator that drives the optical device is disclosed in PTL 1. PTL 1 discloses a small mirror tilt actuator capable of driving a mirror with high accuracy by magnetically driving the mirror by use of a coil, a magnet and a yoke, the mirror being held by a base through a leaf spring.

CITATION LIST

Patent Literature

PTL 1
WO2011/007628

SUMMARY OF INVENTION

Technical Problem

The conventional monochromators that include the stepping motor, the sine bar mechanism, or the like are not suitable for miniaturization. In other words, the stepping motor is relatively large. Furthermore, in a case where rotational resolution of the stepping motor does not satisfy spectral performance specifications of the monochromator, the stepping motor requires a speed reducer (gear), which leads to a further increase in size. Similarly, the sine bar mechanism requires a lead screw, which leads to an increase in size, and thus the sine bar mechanism is not suitable for miniaturization.

On the other hand, in the actuator of PTL 1, a large number of parts are needed to be assembled, and the assembling is complicated accordingly. Furthermore, low assembling accuracy leads to low driving accuracy, and therefore it is considered that the high assembling accuracy is required. In other words, labor and time for assembling a large number of parts with high accuracy are required. Furthermore, while capable of being driven in the single-axis direction, the actuator of PTL 1 is designed also to be driven in the biaxial directions, and thus it is considered that the actuator may be prone to vibration or the like, compared to an actuator exclusive for the single-axis direction.

An object of the present invention is to provide a small single-axis rotary actuator having high accuracy, the single-axis rotary actuator being suitable for rotationally driving an optical device such as a diffraction grating in the single-axis direction. Additionally, the present invention provides a single-axis rotary actuator suitable for forming light having a wide wavelength band.

Solution to Problem

An aspect of a single-axis rotary actuator of the present invention includes:
 a holder including a placing surface for mounting an optical device thereon, and a rotary shaft that is in parallel to the placing surface;
 a fixing section including a bearing holding the rotary shaft of the holder;
 an elastic member including an outer circumferential part fixed to the fixing section, an inner circumferential part fixed to the holder, and an arm section having elasticity and connecting the outer circumferential part and the inner circumferential part; and
 a driving section that includes a coil provided in the holder, and a magnet provided in the fixing section, the driving section being configured to rotate the holder around the rotary shaft, in which
 in the optical device, a length in an axial direction of the rotary shaft is longer than a length in a direction orthogonal to the axial direction of the rotary shaft.

Advantageous Effects of Invention

According to the present invention, there may be provided a small single-axis rotary actuator having high accuracy, the single-axis rotary actuator being suitable for rotationally driving an optical device such as a diffraction grating in the single-axis direction. Additionally, there may be provided a single-axis rotary actuator that is capable of diffracting light from a plurality of light sources at the same time by setting the length in the axial direction of a rotary shaft of an optical device to be longer than the length in the direction orthogonal to the axial direction of the rotary shaft, and thus suitable for forming light having a wide wavelength band.

BRIEF DESCRIPTION OF DRAWINGS

FIG. 28A is a diagram illustrating a state in which the rotary shafts are mounted on a holder, and FIG. 28B is a diagram illustrating a state before the rotary shafts of the holder are mounted;

FIG. 29A is a diagram illustrating a state in which the rotary shafts are off axis as a result of molding, FIG. 29B is a diagram illustrating a state in which one of the rotary shafts is out of a bearing, and FIG. 29C is a diagram illustrating a state in which one of the rotary shafts rotates while swinging inside the bearing;

DESCRIPTION OF EMBODIMENTS

Hereinafter, embodiments of the present invention will be described in detail with reference to the accompanying drawings.

Embodiment 1

Figure 1:
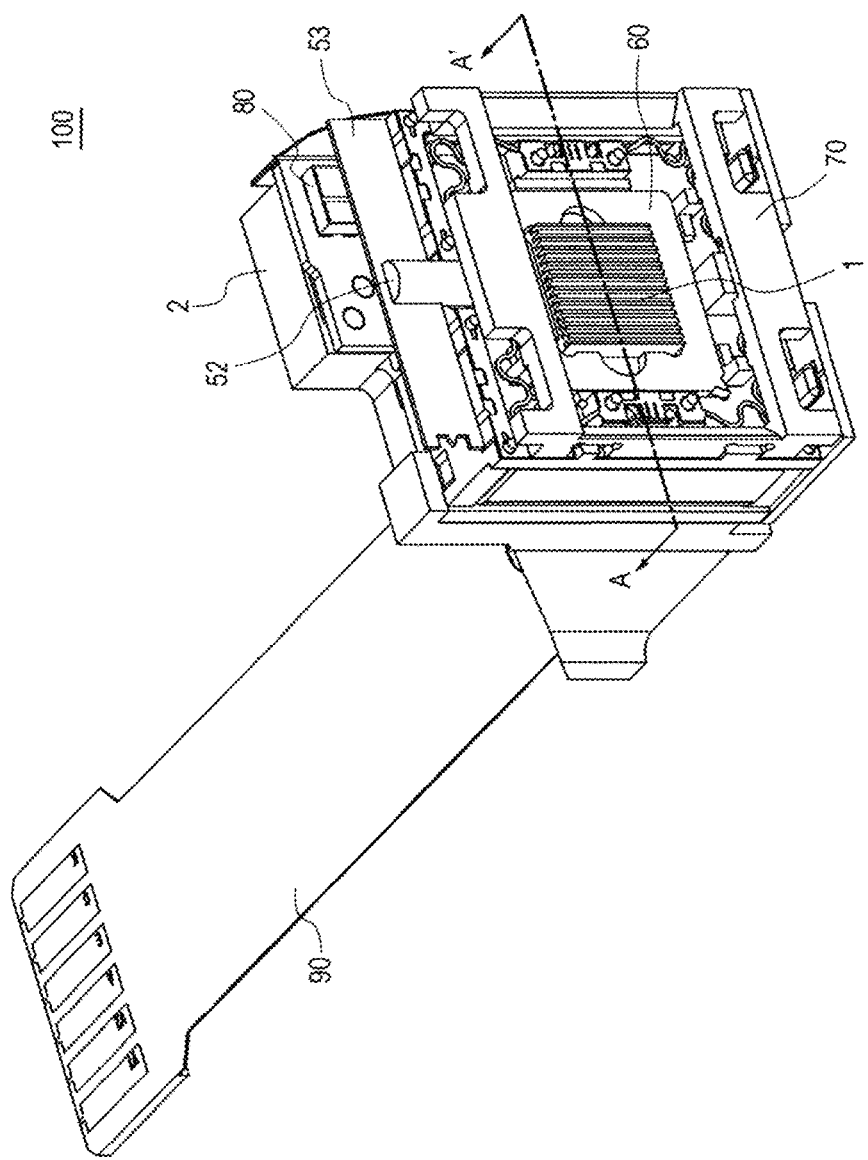
FIG. 1 is a perspective view illustrating an entire configuration of a single-axis rotary actuator according to Embodiment 1.
Figure 2:
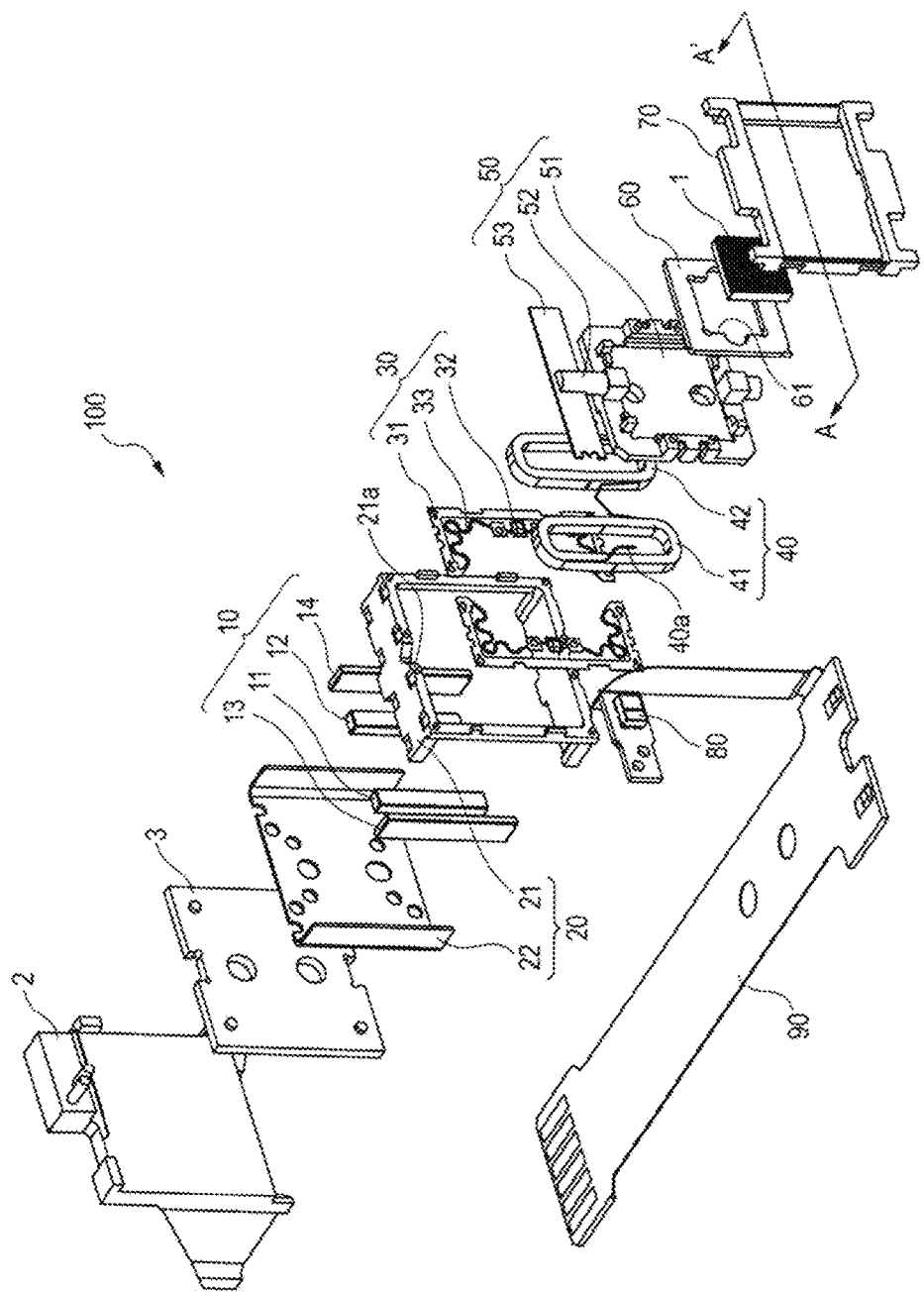
FIG. 2 is an exploded perspective view of the actuator of FIG. 1.

FIG. 1 is a perspective view illustrating an entire configuration of single-axis rotary actuator 100 (hereinafter simply referred to as an "actuator") according to Embodiment 1 of the present invention, and FIG. 2 is an exploded perspective view of actuator 100. Actuator 100 rotationally drives diffraction grating 1 in the single-axis direction to change the wavelength of light which reaches a slit (not illustrated) via diffraction grating 1 in accordance with the rotation angle of diffraction grating 1. An application example of actuator 100 illustrated in FIG. 1 to a spectroscope will be described below with reference to FIG. 19. In the following description, the direction of a reflection surface of diffraction grating 1 is defined as the front surface direction, and the direction on a side opposite to the reflection surface is defined as the back surface direction.

As is clear from FIG. 2, actuator 100 has fixed angle 2, base 3, magnet 10, fixing section 20, leaf springs 30, coil 40, holder 50, spacer 60, cover 70, photo sensor 80, and flexible printed wiring board 90.

Fixed angle 2 has a substantially L-shaped cross section, has a front surface on which respective parts of actuator 100 are mounted, and has a lower surface fixed to a predetermined fixed surface. Consequently, actuator 100 is mounted on a predetermined surface through fixed angle 2.

Fixing section 20 is composed of frame body 21, and yoke 22 that holds magnet 10. Frame body 21 is provided with bearing 21a having a recessed shape, and holding rotary shafts 52 of holder 50. Yoke 22 has a U-shaped cross section, and is fitted to frame body 21 in a state of holding magnet 10. Fixing section 20 is mounted on fixed angle 2 through base 3.

Figure 3:
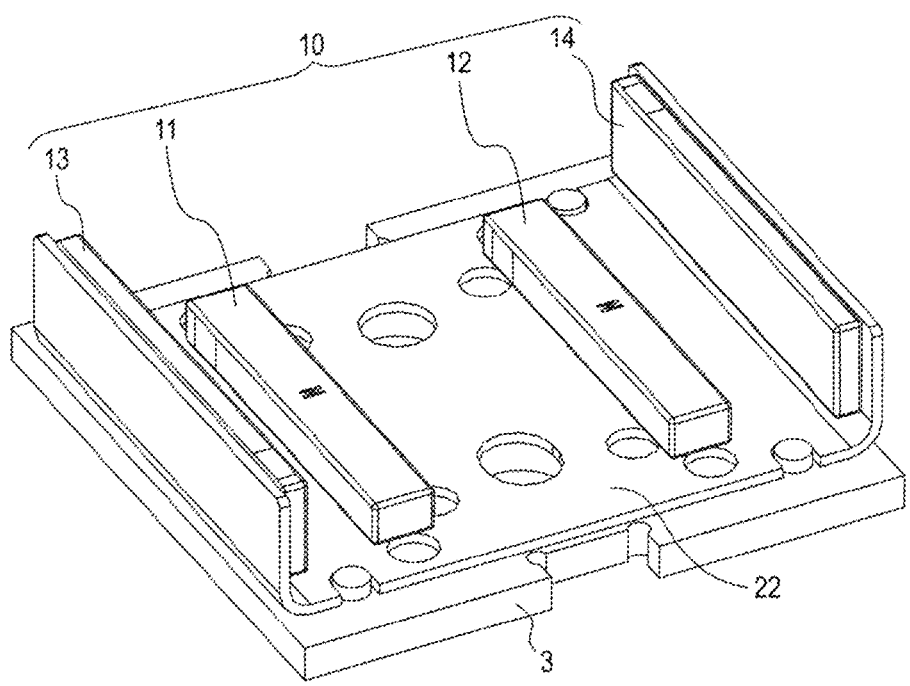
FIG. 3 is a perspective view illustrating a magnet mounted to a yoke.

Magnet 10 is composed of two magnets 11, 12 to be mounted on a bottom surface of yoke 22 at a predetermined interval, and two magnets 13, 14 to be mounted so as to face side surfaces of yoke 22. Magnet 10 mounted to yoke 22 is illustrated in FIG. 3. Magnets 11, 12 are each mounted on yoke 22 such that an S-pole is directed to yoke 22 side, and an N-pole is directed to the front surface side. Magnets 13, 14 are mounted on yoke 22 such that the respective N-poles are directed to yoke 22, and the respective S-poles are directed to the front surface side, that is, such that the S-poles face each other. All the N-poles and the S-poles may be reverse to those in FIG. 3. In other words, magnets 11, 12 may be each mounted on yoke 22 such that the N-pole is directed to yoke 22 side, and the S-pole is directed to the front surface side, and magnets 13, 14 may be mounted on yoke 22 such that the respective S-poles are directed to yoke 22 side, and the respective N-poles are directed to the front surface side, that is, such that the N-poles face each other.

Frame body 21 has a substantially square outer shape, and leaf springs 30 are mounted on an edge part of frame body 21. Additionally, holder 50 and coil 40 fixed to holder 50 are disposed in a hollow portion of frame body 21.

Figure 4:
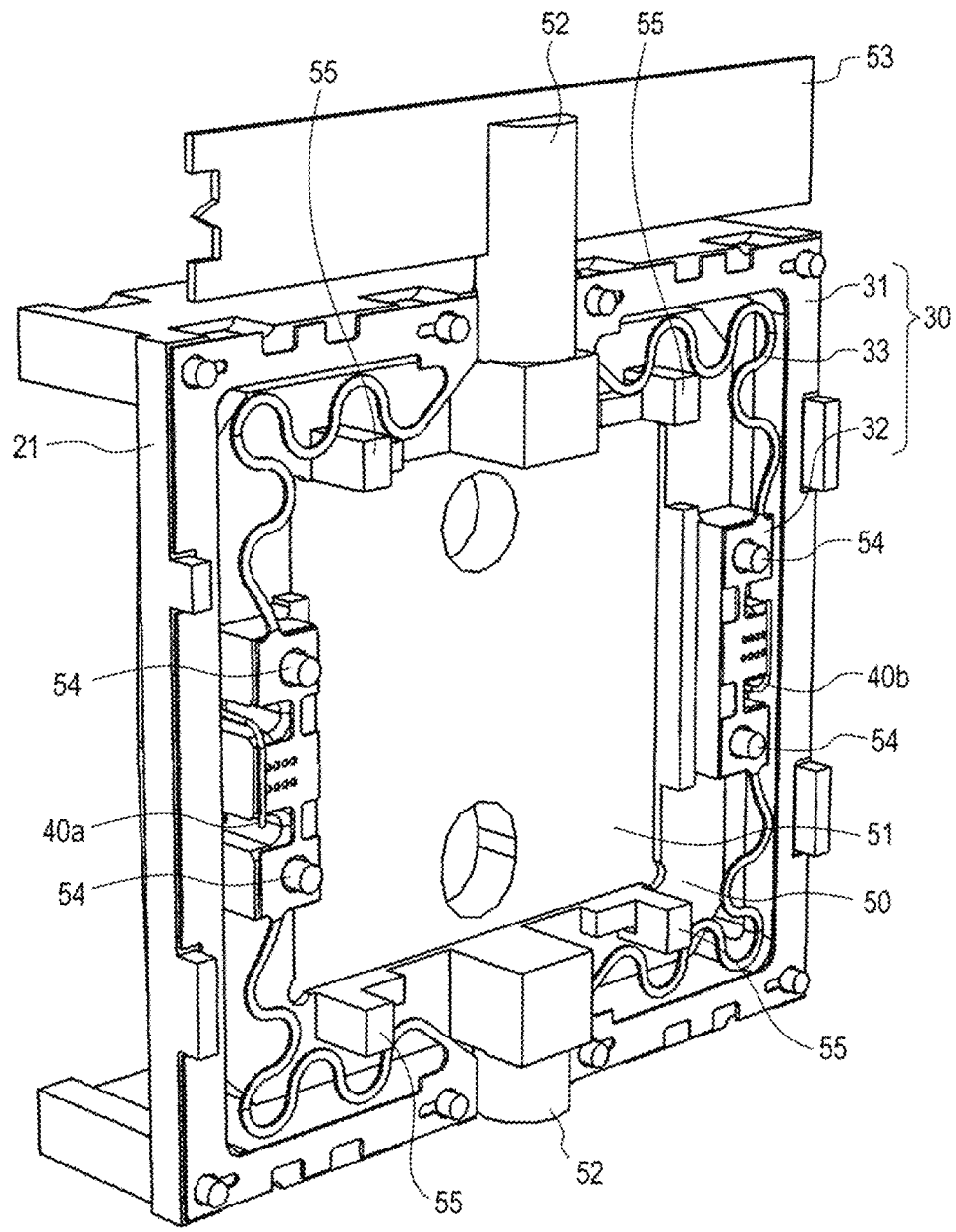
FIG. 4 is a perspective view illustrating a state in which leaf springs and a holder are mounted on a frame body.

As is clear from FIG. 4, leaf springs 30 are each composed of outer circumferential part 31 fixed to frame body 21 of fixing section 20, inner circumferential part 32 fixed to holder 50, and arm sections 33 having elasticity, and connecting outer circumferential part 31 and inner circumferential part 32.

Holder 50 has a holder body 51 having a substantially square outer shape, rotary shafts 52 projecting from holder body 51 in the vertical direction, and reflector 53 mounted on rotary shafts 52. A placing surface for placing diffraction grating 1 on the front surface side of holder body 51 is formed, and diffraction grating 1 is fixed to this placing surface by adhesion. Actually, diffraction grating 1 is adhered to the placing surface of holder body 51 along with spacer 60 in a state of being fitted into opening 61 of spacer 60 to be positioned. Reflector 53 is disposed such that a principal plane exists on a surface formed by extending a principal plane of holder body 51.

A state in which leaf springs 30 and holder 50 are mounted on frame body 21 is illustrated in FIG. 4. As is clear from the drawing, outer circumferential parts 31 of leaf springs 30 are fixed to an edge part of frame body 21. Holder body 51 is disposed in the hollow portion of frame body 21. In this state, rotary shafts 52 are pivotally supported by bearing 21a of frame body 21, so that holder 50 is rotatable around rotary shafts 52. Additionally, projections 54 of holder 50 are fitted to inner circumferential parts 32 of leaf springs 30. Consequently, holder 50 is rotatable with rotary shafts 52 as a rotation center, and urges so as to be returned to a neutral position illustrated in FIG. 4 by leaf springs 30.

Figure 5:
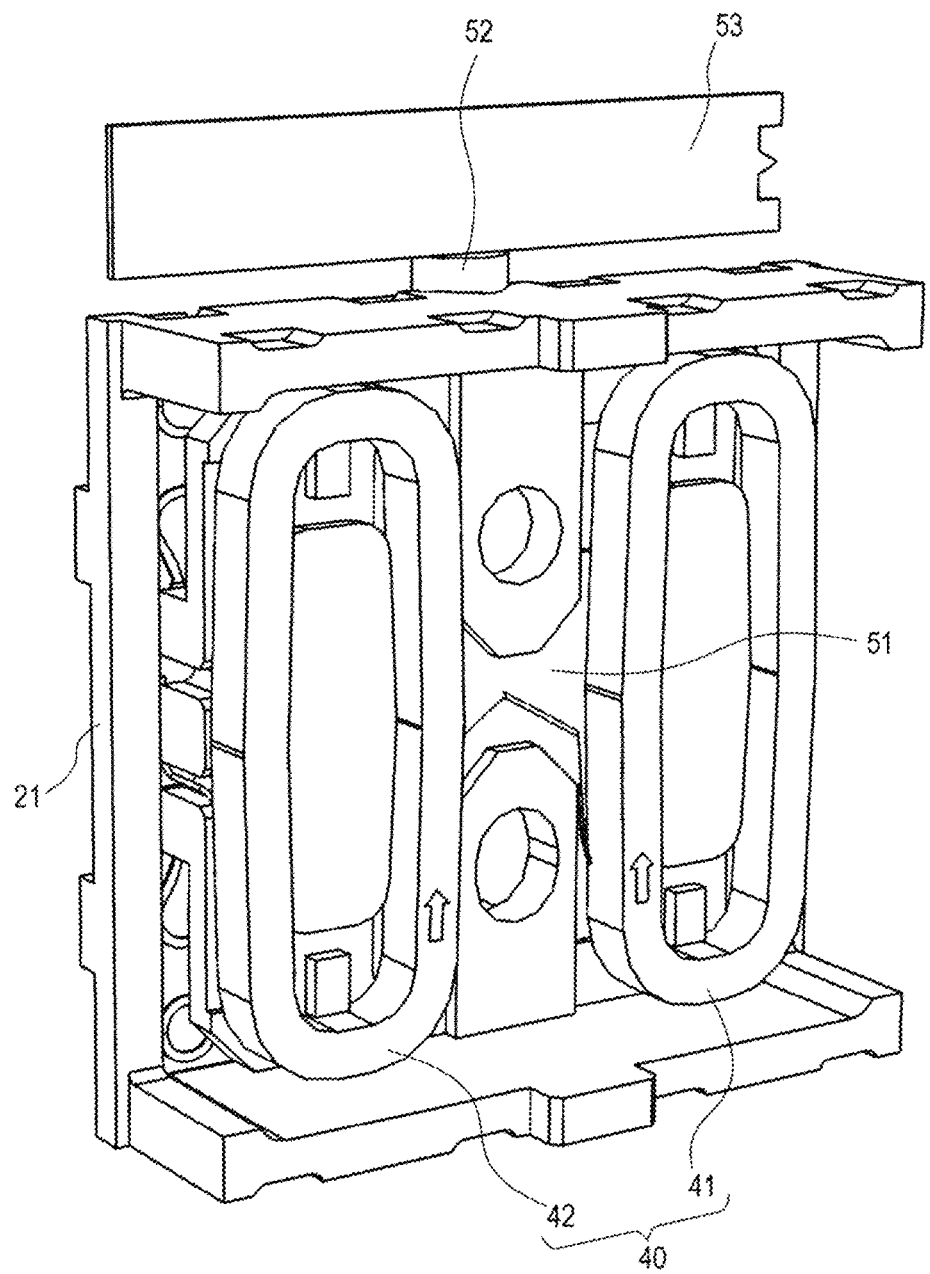
FIG. 5 is a perspective view illustrating a coil mounted on a back surface side of the holder.

Coil 40 is mounted on the back surface side of holder body 51. This state is illustrated in FIG. 5. To the back surface of holder body 51, two air core coils 41, 42 are fixed with a predetermined interval between them. As illustrated by arrows in the drawing, respective currents in the opposite directions to each other flow in coils 41, 42. More specifically, in FIG. 5, a current in the clockwise direction flows in coil 41, and a current in the counterclockwise direction flows in coil 42.

Leaf springs 30 are each made of a good conductive material such as metal, and power is supplied to coil 40 through leaf springs 30. More specifically, as illustrated in FIG. 4, a power supply section (not illustrated) of flexible printed wiring board 90 is connected to outer circumferential parts 31 of leaf springs 30, and terminals 40a, 40b of coils 41, 42 are connected to inner circumferential parts 32 of leaf springs 30. Actually, inner circumferential parts 32 and terminals 40a, 40b are soldered. Consequently, it is possible to supply power from flexible printed wiring board 90 to coil 40 as a moving part from through leaf springs 30. Thus, leaf springs 30 also each have a power supply function, so that it is possible to simplify a power supply system, and it is possible to promote miniaturization of an apparatus.

Figure 6:
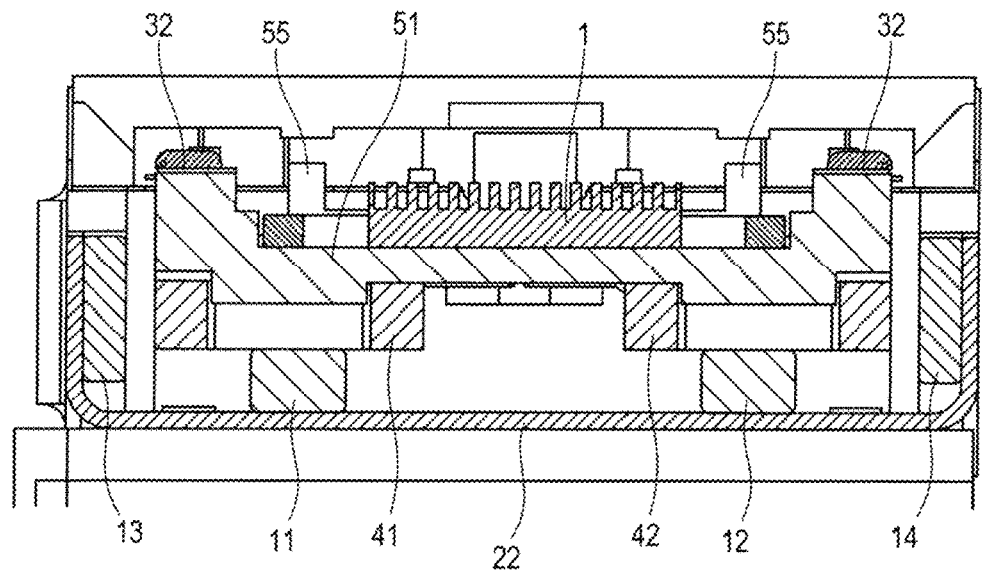
FIG. 6 is an A-A' sectional view of FIG. 1 and FIG. 2.

FIG. 6 is an A-A' cross section of FIG. 1 and FIG. 2 (in assembly), the A-A' cross section being taken along a line passing through the center of diffraction grating 1. As is clear from FIG. 6, air core coil 41 is disposed above rectangular parallelopiped magnet 11, and air core coil 42 is disposed above rectangular parallelopiped magnet 12. Additionally, magnet 13 is disposed on the side of coil 41, and magnet 14 is disposed on the side of coil 42. Herein, as is clear from FIGS. 9A to 9C described below, when holder 50 rotates, magnets 11, 12 alternately enter air core portions of air core coils 41, 42. At this time, in order not to cause magnets 11, 12 and coils 41, 42 to collide with each other, magnets 11, 12 are disposed so as to slightly shift to the rotary shaft sides from the centers of the air core portions of air core coils 41, 42 in a state of rotation angle 0° illustrated in FIG. 6.

Figure 7:
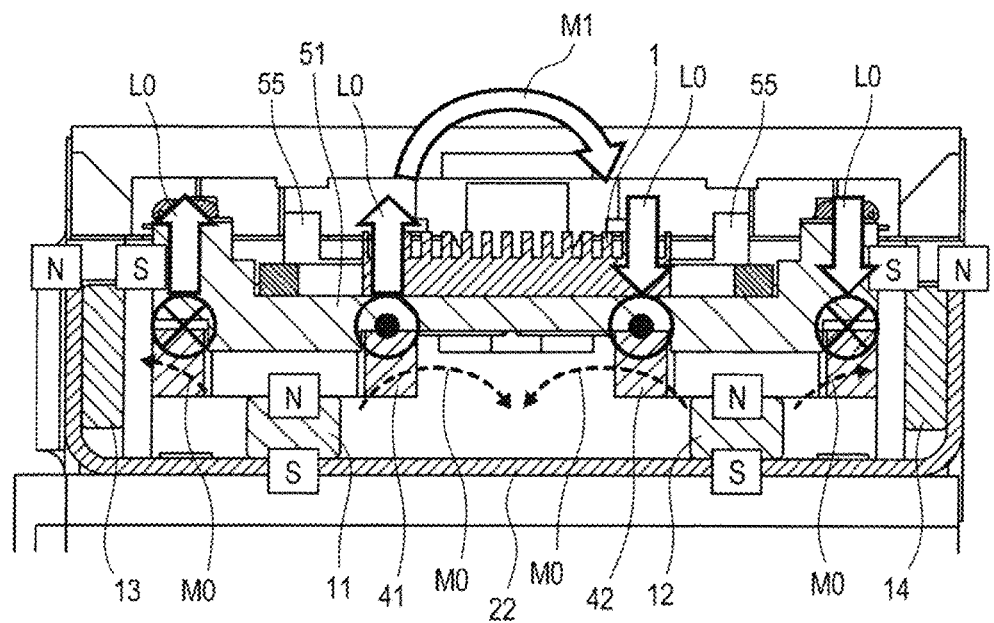
FIG. 7 is a diagram for illustrating the direction of magnetic force, the direction of a current, the direction of Lorentz force, and the direction of rotation moment generated in the actuator.

FIG. 7 illustrates the direction of magnetic force M0, the direction of a current, the direction of Lorentz force L0, and the direction of rotation moment M1 generated in the actuator. Magnetic force M0 is generated from magnet 11 of the bottom surface of yoke 22 toward magnet 13 on the side surface of yoke 22, and magnetic force M0 is generated from magnet 12 of the bottom surface of yoke 22 toward magnet 14 on the side surface of yoke 22. Additionally, magnetic force M0 is generated from each of magnets 11, 12 toward the center of yoke 22. Lorentz force L0 is generated in each of coils 41, 42 in accordance with each magnetic force M0, and the direction of a current flowing in each of coils 41, 42. More specifically, when the respective currents in the directions illustrated in the drawing are made to flow in coils 41, 42, upward Lorentz force L0 is generated in coil 41, and downward Lorentz force L0 is generated in coil 42. As a result, rotation moment M1 illustrated by an arrow is applied to holder body 51, and holder 50, and diffraction grating 1 fixed to holder 50 rotate. When respective currents reverse to the direction illustrated in the drawing are made to flow in coils 41, 42, downward Lorentz force L0 is generated in coil 41, and upward Lorentz force L0 is generated in coil 42. As a result, rotation moment M1 in the direction reverse to the arrow is applied to holder body 51, and holder 50, and diffraction grating 1 fixed to holder 50 rotate in the direction reverse to the arrow.

Herein, magnets 13, 14 are provided on the side surfaces of yoke 22, so that it is possible to concentrate a magnetic flux on coils 41, 42. As a result, there may be provided improvement of torque, and reduction of power consumption. Additionally, magnets 13, 14 are provided on the side surfaces of yoke 22, so that particularly, it is possible to generate strong magnetic force at a position far from the rotary shafts. Consequently, coils 41, 42 can obtain strong Lorentz force L0 at a position far from the rotary shafts. As a result, it is possible to efficiently obtain large rotation moment M1. However, a configuration in which magnets 13, 14 are not provided may be employed. Thus, compared to a case where magnets 13, 14 are provided, there is a demerit that torque lowers, and power consumption is increased, but the size is reduced, and therefore there is a merit that miniaturization can be attained.

Figure 8:
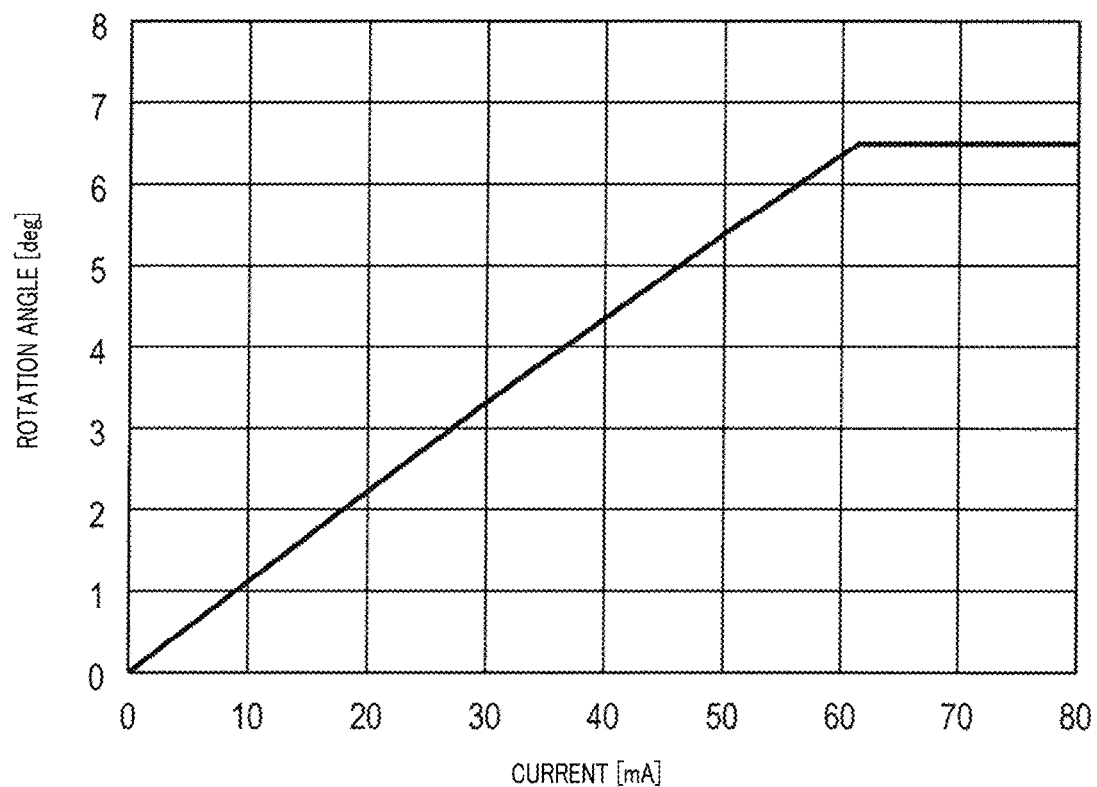
FIG. 8 is a diagram illustrating a relation between a value of a current that flows in each coil, and the rotation angle of a holder (diffraction grating)

FIG. 8 illustrates a relation between a value of a current that flows in each of coils 41, 42, and the rotation angle of holder 50 (diffraction grating 1). Holder 50 (diffraction grating 1) rotates up to such a position that rotation moment in accordance with the value of a current flowing in each of coils 41, 42, and urging force of leaf springs 30 balance each other. Then, when the angle reaches a certain rotation angle (6.5° in the example of FIG. 8), projections 55 of holder 50 abut on a back surface of cover 70 to stop the rotation of holder 50. Thus, cover 70 restricts the rotation of holder 50, so that the rotation is able to be restricted not only by electrical rotation control but also mechanically, and therefore it is possible to reliably prevent rotation that exceeds a predetermined range. Additionally, rotary shafts 52 are covered with cover 70 (FIG. 1), and therefore it is possible to prevent derailment of holder 50.

Figure 9A:
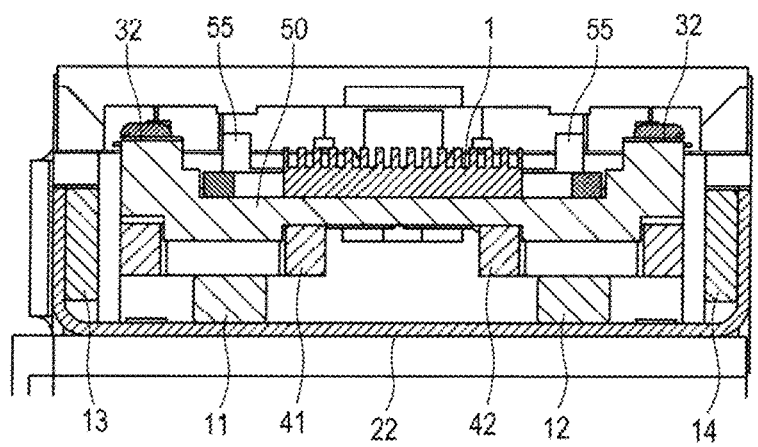
FIGS. 9A to 9C each illustrates a rotation state of the holder (diffraction grating)
Figure 9B:
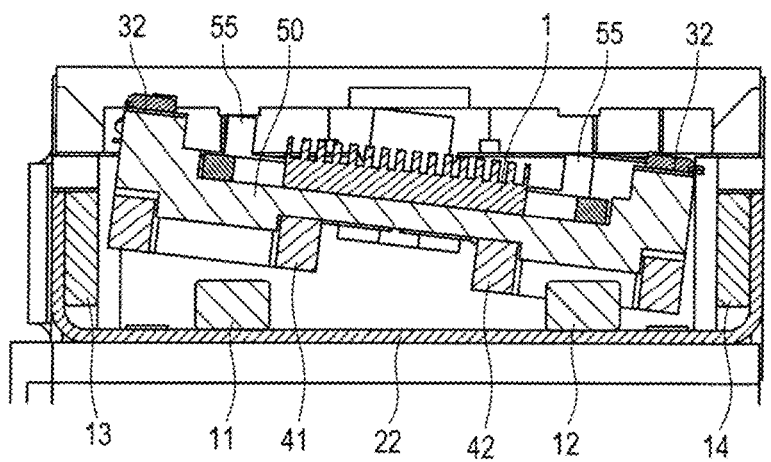
Figure 9C:
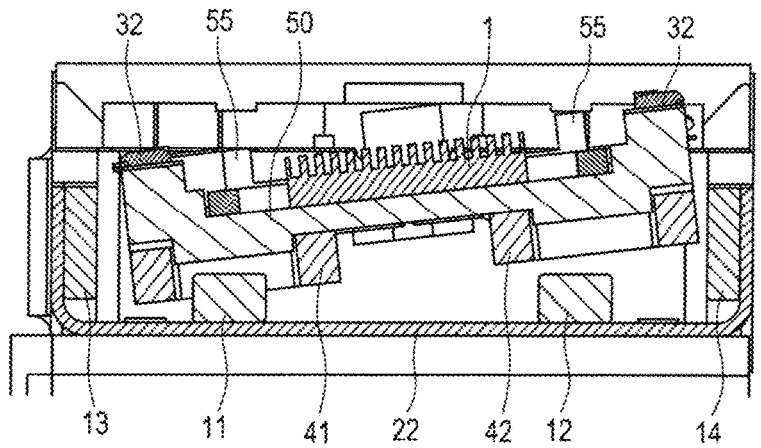

FIGS. 9A to 9C each are a diagram illustrating a rotation state of holder 50 (diffraction grating 1). FIG. 9A illustrates a state in which no current flows in coils 41, 42, and holder 50 (diffraction grating 1) is in a neutral (that is, rotation angle 0°) state by urging force of leaf springs 30. FIG. 9B illustrates a state in which a current in the direction illustrated in FIG. 7 flows in each of coils 41, 42, holder 50 (diffraction grating 1) is in a state of being rotated in the clockwise direction in the drawing. FIG. 9C illustrates a state in which a current in the direction reverse to the direction illustrated in FIG. 7 flows in each of coils 41, 42, and holder 50 (diffraction grating 1) is in a state of being rotated in the counterclockwise direction in the drawings. Thus, the direction of a current supplied to each of coils 41, 42 is changed, so that holder 50 (diffraction grating 1) can be rotationally driven in the clockwise direction and the counterclockwise direction with the neutral position of FIG. 9A as the rotation center.

The rotation position of holder 50 (diffraction grating 1) is detected by photo sensor 80 mounted on fixed angle 2, a detection result is sent out to a control section (not illustrated) through flexible printed wiring board 90. The control section supplies a current at a value in accordance with the detection result to each of coils 41, 42 through flexible printed wiring board 90, so that the rotation of holder 50 (diffraction grating 1) is controlled.

Figure 10A:
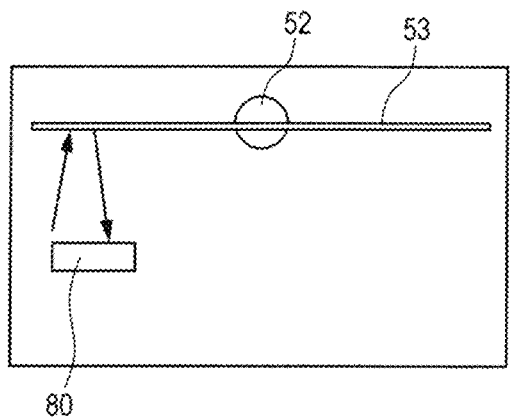
FIGS. 10A to 10C each are a diagram for illustrating rotation position detection using a photo sensor and a reflector.
Figure 10B:
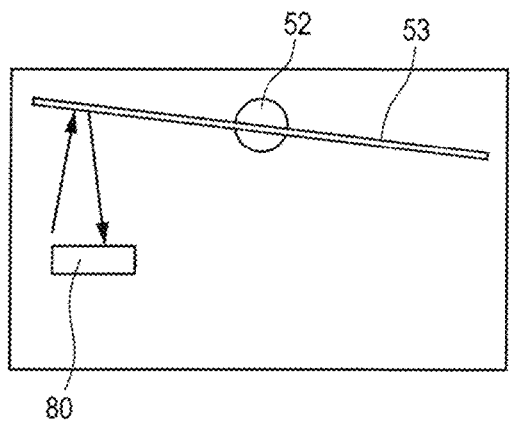
Figure 10C:
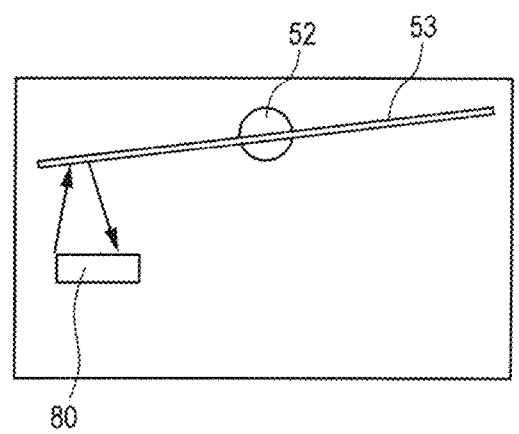

Actually, as illustrated in FIGS. 10A, 10B, and 10C, photo sensor 80 irradiates reflector 53 with light, and a light amount of reflected light is detected, so that the rotation position is detected. In other words, the nearer a distance from photo sensor 80 to reflector 53 is, the larger the light amount of reflected light becomes, and therefore it is possible to obtain the rotation position based on the light amount.

Figure 11A:
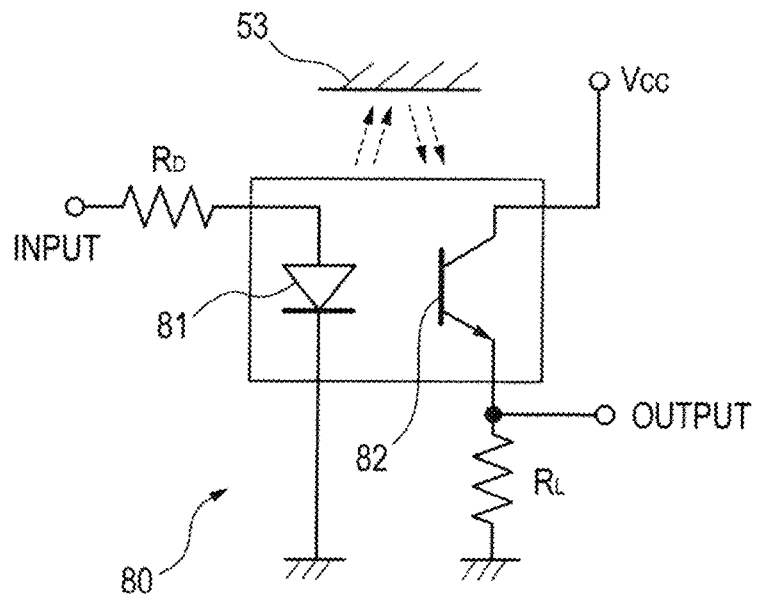
FIG. 11A is a diagram illustrating a configuration example of the photo sensor.
Figure 11B:
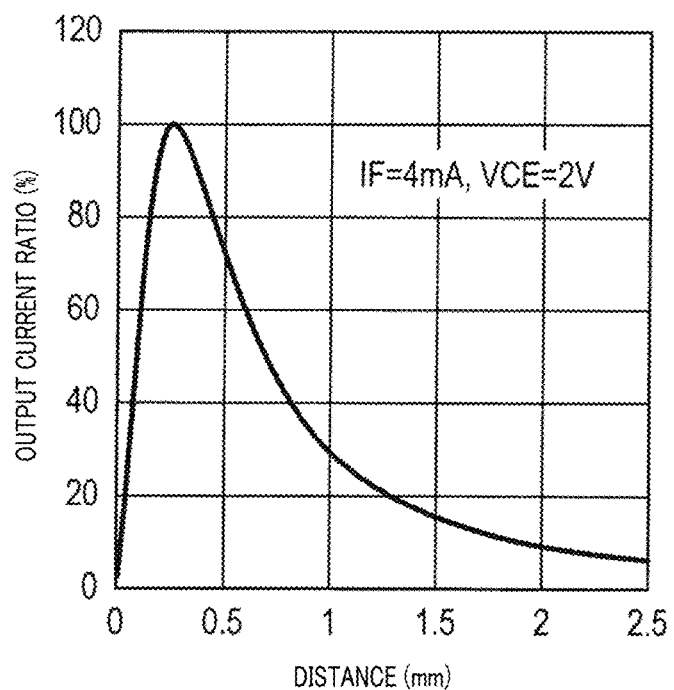
FIG. 11B is a graph illustrating a relation between a distance from the photo sensor to the reflector, and an output current ratio.

FIG. 11A illustrates a configuration example of photo sensor 80. In photo sensor 80, light is emitted by light-emitting diode 81, reflected light from the reflector is received by phototransistor 82, and an output current in accordance with a reflected light amount is obtained. FIG. 11B is a graph illustrating a relation between a distance from photo sensor 80 to reflector 53, and an output current ratio (output current when a maximum light amount is obtained is set to 100%).

Figure 12A:
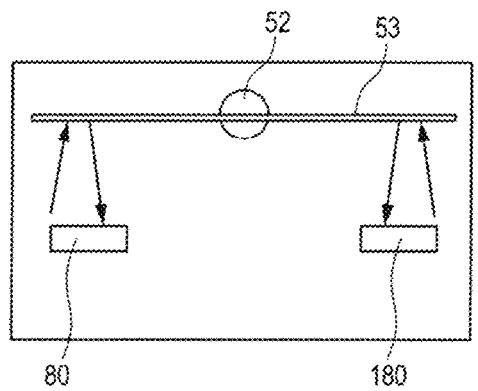
FIGS. 12A to 12C each are a diagram for illustrating rotation position detection using photo sensors and a reflector in a case where the two photo sensors are provided.
Figure 12B:
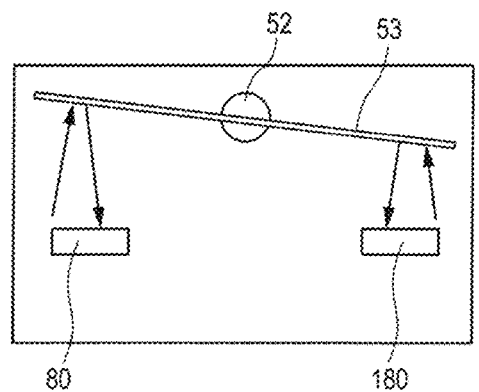
Figure 12C:
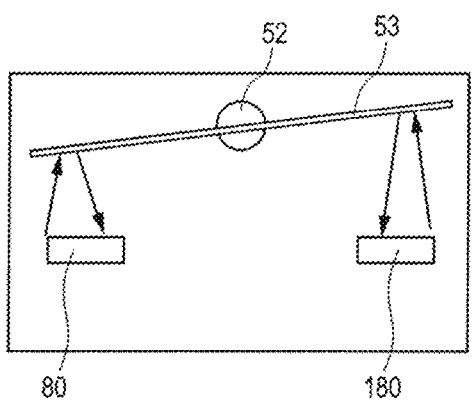
Figure 13:
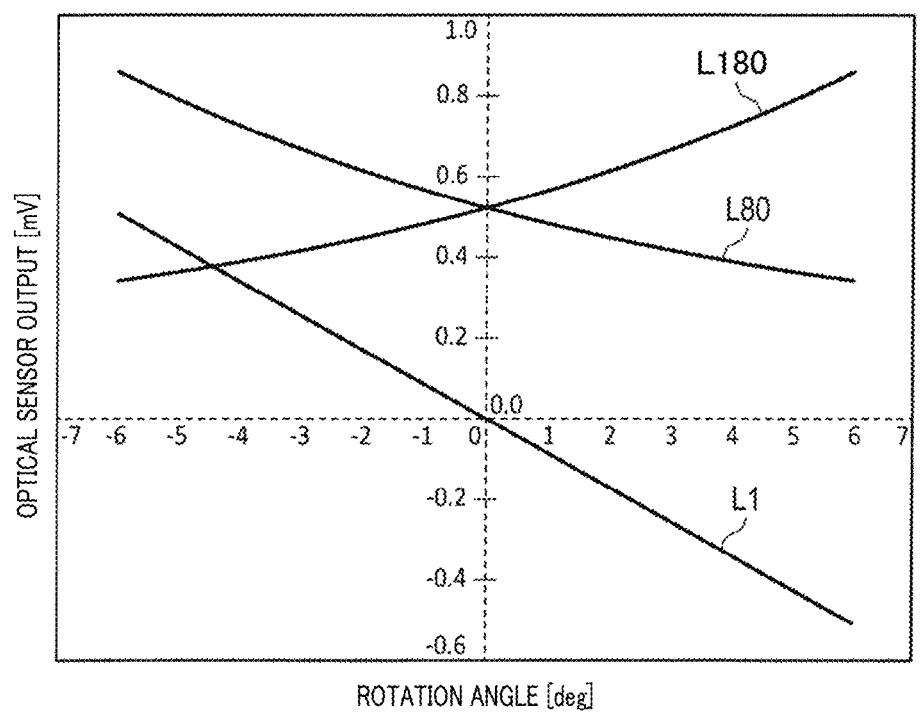
FIG. 13 is a diagram illustrating a relation between the rotation angle and sensor output in a case where the two photo sensors are provided.

In the embodiment, the rotation position is detected by one photo sensor 80. However, as illustrated in FIGS. 12A, 12B, and 12C, photo sensors 80, 180 may be provided at positions on both right and left sides with respect to rotary shafts 52. As illustrated in FIG. 13, a difference between sensor outputs L80, L180 obtained by these photo sensor 80, 180 is taken, and a linear sensor output L1 can be obtained.

Figure 14:
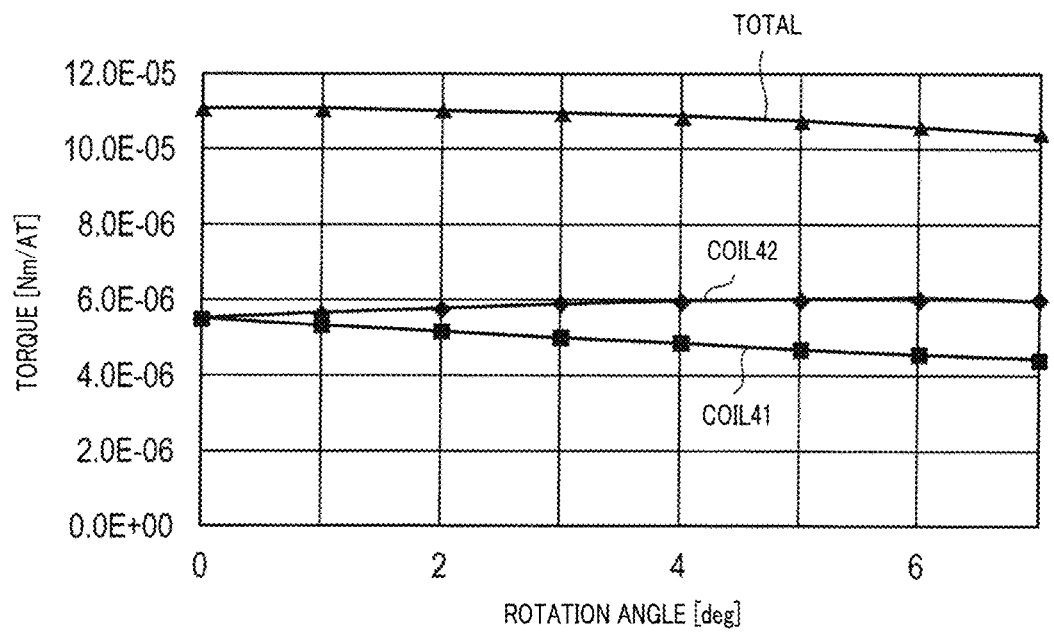
FIG. 14 is a graph illustrating torque generated by the actuator of the embodiment.

FIG. 14 is a graph illustrating torque generated by actuator 100 of this embodiment. FIG. 14 illustrates torque particularly generated in a case where the current in the direction illustrated in FIG. 7 is supplied. The larger the rotation angle becomes, the smaller the torque of coil 41 that rotates in the direction away from magnet 11 becomes. On the other hand, the larger the rotation angle becomes, the larger the torque of coil 42 that rotates in the direction approaching magnet 12 becomes. Accordingly, a reduced amount of the torque of coil 41 that rotates in the direction away from magnet 11 is supplemented by increase of the torque of coil 42 that rotates in the direction approaching magnet 12. As a result, even when the rotation angle is increased, a total torque is not extremely reduced, and is substantially flat. Particularly, in actuator 100 of this embodiment, a rotatable range of holder 50 (diffraction grating 1) is set to −6.5° to +6.5°, and substantially flat torque can be generated in this rotatable range. Of course, the rotatable range is not limited to this, and may be ±6.5° or more. For example, when projections 55 of holder 50 are lowered, the holder more largely rotates.

Figure 15:
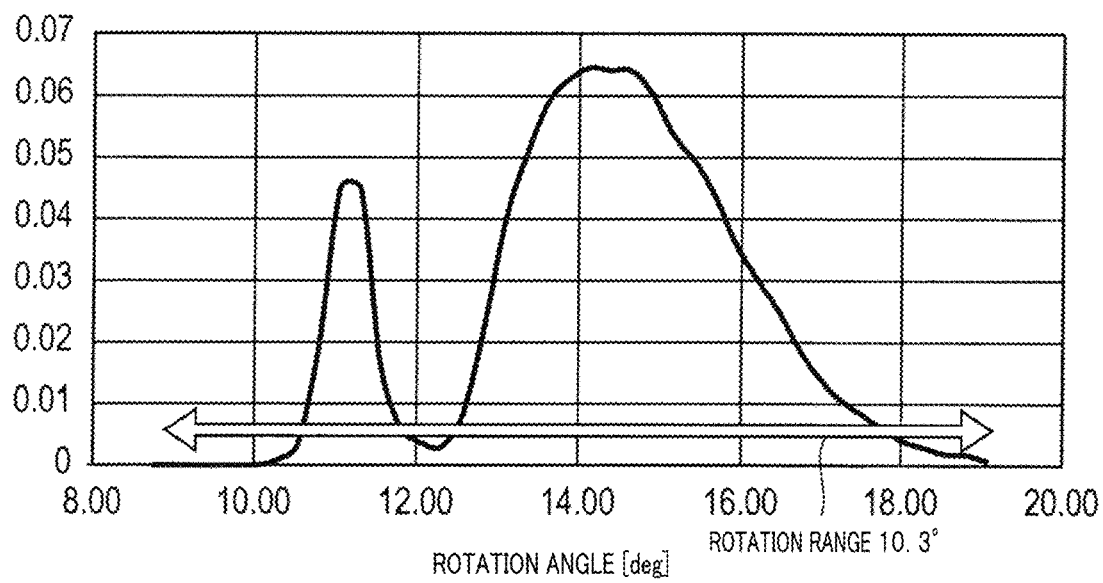
FIG. 15 is a diagram illustrating a spectrum in a case where white light is dispersed by rotating a diffraction grating having a grating pitch of 1.5 μm.

FIG. 15 illustrates a spectrum in a case where diffraction grating 1 having a grating pitch of 1.5 μm is rotated, and white light is dispersed. From FIG. 15, it is found that when diffraction grating 1 can be rotated by 10.3° or more, a whole visible light zone can be diffracted. In actuator 100 of this embodiment, diffraction grating 1 can be rotated in a range of −6.5° to +6.5°, that is, rotated by 13°, and therefore the whole visible light zone can be diffracted.

As described above, according to this embodiment, there may be provided small single-axis rotary actuator 100 with high accuracy, which is provided with holder 50 having the placing surface for mounting diffraction grating 1, and rotary shafts 52, fixing section 20 having bearing 21a holding rotary shafts 52 of holder 50, elastic members (leaf springs 30) composed of outer circumferential parts 31 fixed to fixing section 20, and inner circumferential parts 32 fixed to holder 50, and arm sections 33 having elasticity, and connecting outer circumferential parts 31 and inner circumferential parts 32, and a driving section having coil 40 provided in holder 50, and magnet 10 provided in fixing section 20, single-axis rotary actuator 100 being suitable for rotationally driving an optical device such as diffraction grating 1 in the single-axis direction.

It is possible to stop diffraction grating 1 at an arbitrary angle, and it is possible to take out an arbitrary wavelength component in incident light. In other words, when the incident light is white, a component of blue, green, red, or the like can be taken out in accordance with the angle at which diffraction grating 1 is stopped, and therefore the actuator is also able to be used for a wavelength variable light source.

Two air core coils 41, 42 are disposed so as to be housed on the back surface of holder 50, and magnets 11, 12 enter the air core portions of coils 41, 42 respectively, and therefore there may be provided single-axis rotary actuator 100 having high magnetic efficiency, and having a small XY size.

Mounting of diffraction grating 1 can be performed by simply mounting diffraction grating 1 on the placing surface of holder 50, and therefore diffraction grating 1 having various shapes can be easily applied. Actually, spacer 60 provided with opening 61 contoured to fit the shape of diffraction grating 1 is used, so that it is possible to easily correspond to diffraction grating 1 having various sizes and shapes.

A so-called moving coil system in which magnet 10 having heavy weight does not rotate, and coils 41, 42 having light weight rotate is employed, so that it is possible to perform rotating operation having good responsiveness with small torque. Furthermore, when a resin material of each rotary shaft 52, and a resin material of bearing 21a are made of different materials, it is possible to improve a sliding property, and therefore it is possible to perform rotating operation having good responsiveness with smaller torque.

The rotation angle is detected by using photo sensor 80 and reflector 53, so that it is possible to miniaturize an apparatus compared to a case where a rotary encoder or the like is used. However, the configuration for detecting the angle is not limited to this. For example, the rotary encoder may be used, and a hall element may be used. The angle may be detected by detecting a driving current with a shunt resistor. Furthermore, the angle may be detected by measuring the respective inductances of coils 41, 42. In other words, when the rotation angle changes, a magnetic flux that penetrates coils 41, 42 changes, and the inductances are changed, and therefore it is possible to detect the angle by measuring these inductances. Furthermore, in addition to the coil for driving, a coil for detection may be provided, and induced electromotive force generated in this coil for detection is measured, so that the rotation angle may be detected. Furthermore, the photo sensor may be disposed so as to be housed in the actuator.

Figure 16:
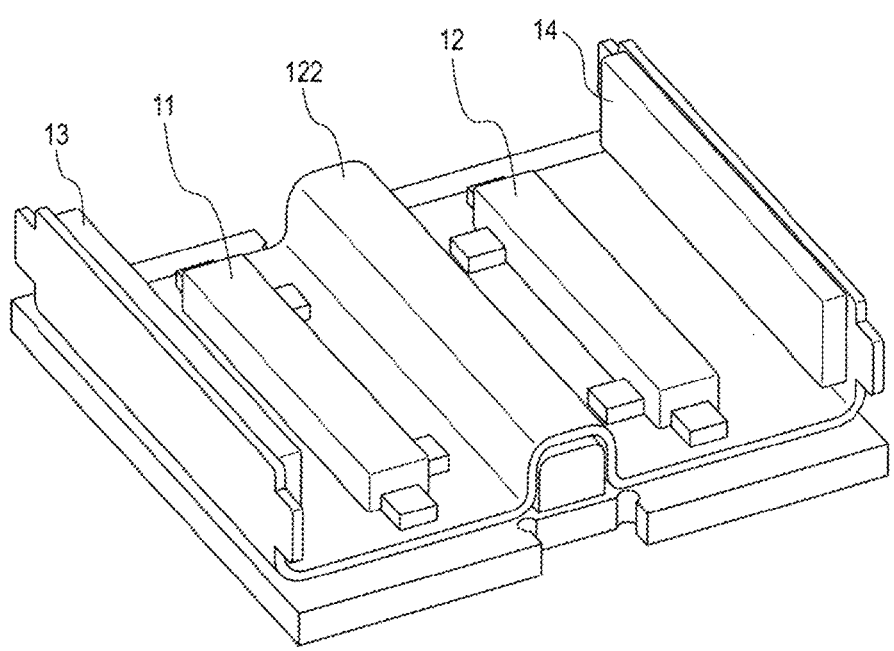
FIG. 16 is a perspective view illustrating a shape example of a yoke according to another embodiment.

In the above embodiment, for example, as illustrated in FIG. 3, yoke 22 has the U-shaped cross section. However, the shape of the yoke is not limited to this. The shape of the yoke may be, for example, a shape illustrated in FIG. 16. In other words, yoke 122 may be formed in a shape having a protrusion in a central portion. Consequently, a magnetic flux near the protrusion can be strengthened, and therefore it is possible to generate larger rotational torque.

Figure 17:
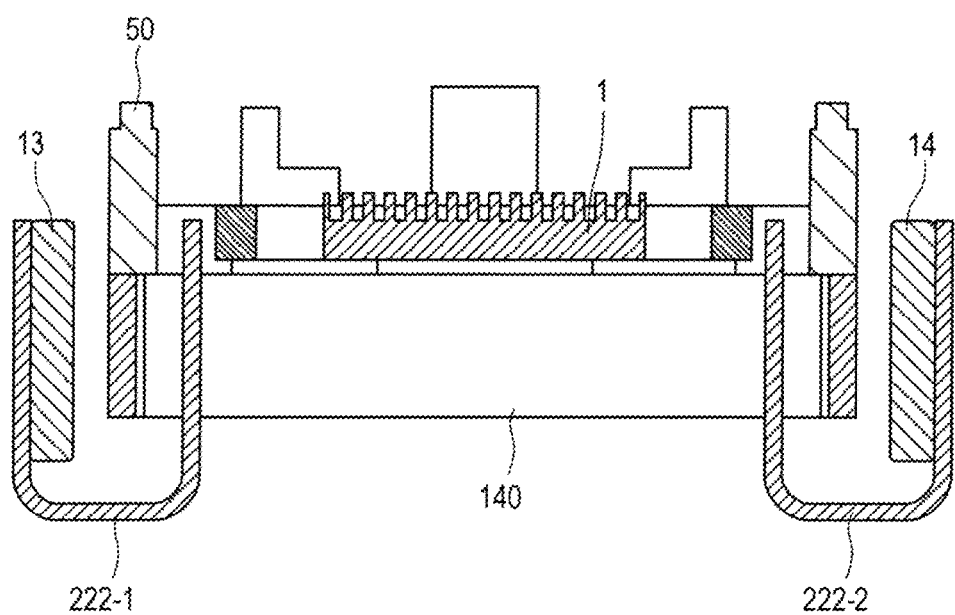
FIG. 17 is a sectional view illustrating a configuration example of a coil, a yoke and a magnet according to another embodiment.

A configuration of the coils, the yoke, and the magnets is not limited to the configuration of the above embodiment, and may be, for example, a configuration illustrated in FIG. 17. In the configuration of FIG. 17, one air core coil 140 is provided on the back surface side of holder 50, and first and second yokes 222-1 and 222-2 are provided with this air core coil 140 interposed therebetween. In first and second yokes 222-1 and 222-2, magnets 13, 14 are provided respectively. Consequently, a current flows in coil 140, so that it is possible to rotate holder 50 (diffraction grating 1).

The shape of grating grooves of diffraction grating 1 to be mounted on holder 50 can be a rectangular shape, a sawtooth shape, a sine wave shape, or the like. Diffraction grating 1 to be mounted on holder 50 may have a reflection surface having a recessed shape. Such a diffraction grating is used, so that even when a condensing lens system is not provided, light diffracted by the diffraction grating can be incident in a slit.

Furthermore, a transmission type diffraction grating may be used as diffraction grating 1. In this case, an opening or a cutout for allowing light transmitted through diffraction grating 1 to pass may be formed in holder 50 or yoke 22.

Figure 18:
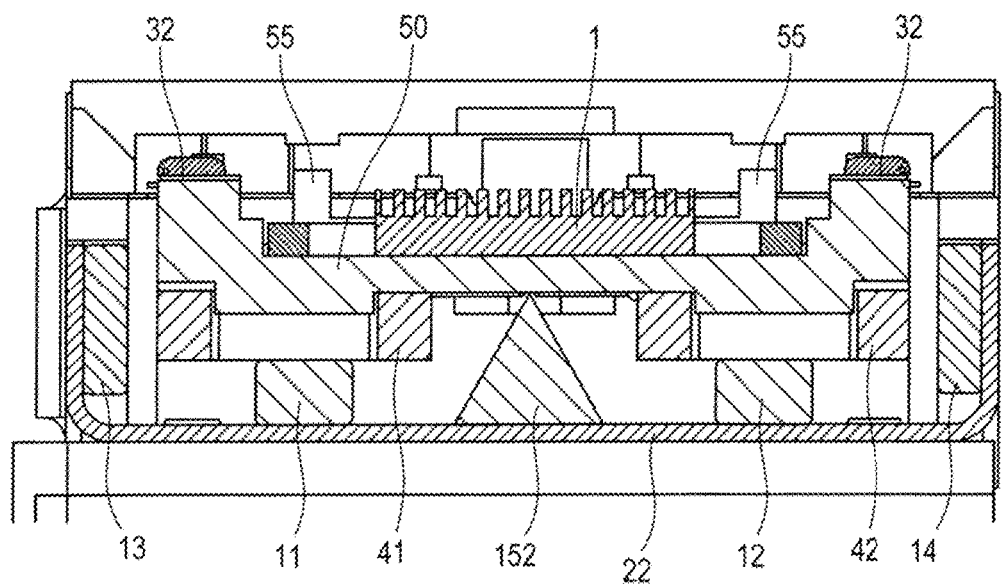
FIG. 18 is a sectional view illustrating a configuration example of a bearing according to another embodiment.

In the above embodiment, single-axis rotation 1 is implemented by holding rotary shafts 52 of holder 50 by recessed bearing 21a of fixing section 20. However, the configuration of the bearing is not limited to this. For example, as illustrated in FIG. 18, fulcrum member 152 may be provided on a lower side (back surface side) at a position which becomes a rotary axis of holder 50, and holder 50 may be held by fulcrum member 152 so as to be lifted against urging force of leaf springs 30. Thus, holder 50 can be rotated with fulcrum member 152 as the rotary axis.

Figure 19:
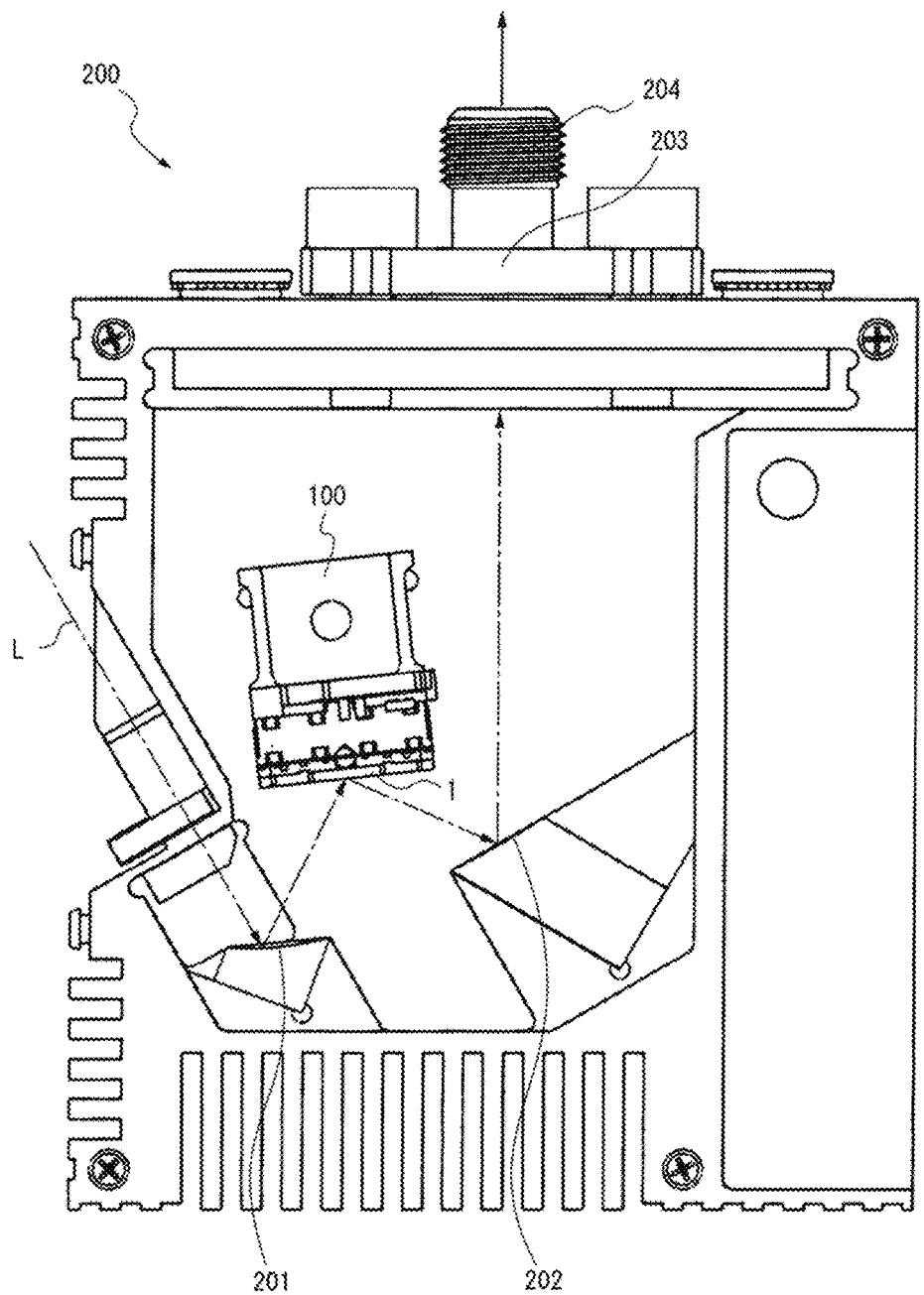
FIG. 19 is a plan view illustrating a configuration example of a spectroscope including the actuator of the embodiment.

FIG. 19 is plan view illustrating a configuration of spectroscope 200 including actuator 100 of the above embodiment. Light L emitted from an optical unit (not illustrated) is incident on diffraction grating 1 mounted on actuator 100 via reflecting mirror 201. The light diffracted by diffraction grating 1 is directed toward slit part 203 provided with the slit (not illustrated) via reflecting mirror 202. Light dispersed by passing through the slit is emitted from light exit 204. This dispersed light can be utilized as, for example, light for measuring bio-information such as a urine component and a blood component. According to an experiment, actuator 100 of the above embodiment can rotationally drive diffraction grating 1 without resonating in 70 to 80 Hz, and therefore there may be provided spectral performance suitable for measuring the bio-information such as the urine component and the blood component for a short time.

Furthermore, the optical device mounted on holder 50 is not limited to diffraction grating 1, and, for example, a mirror or the like may be mounted. Actuator 100 of the above embodiment is not limited to an actuator for a spectroscope, and can be used as, for example, an actuator for a rotation mechanism or the like for changing light distribution for a head light for a vehicle.

Embodiment 2

Figure 20:
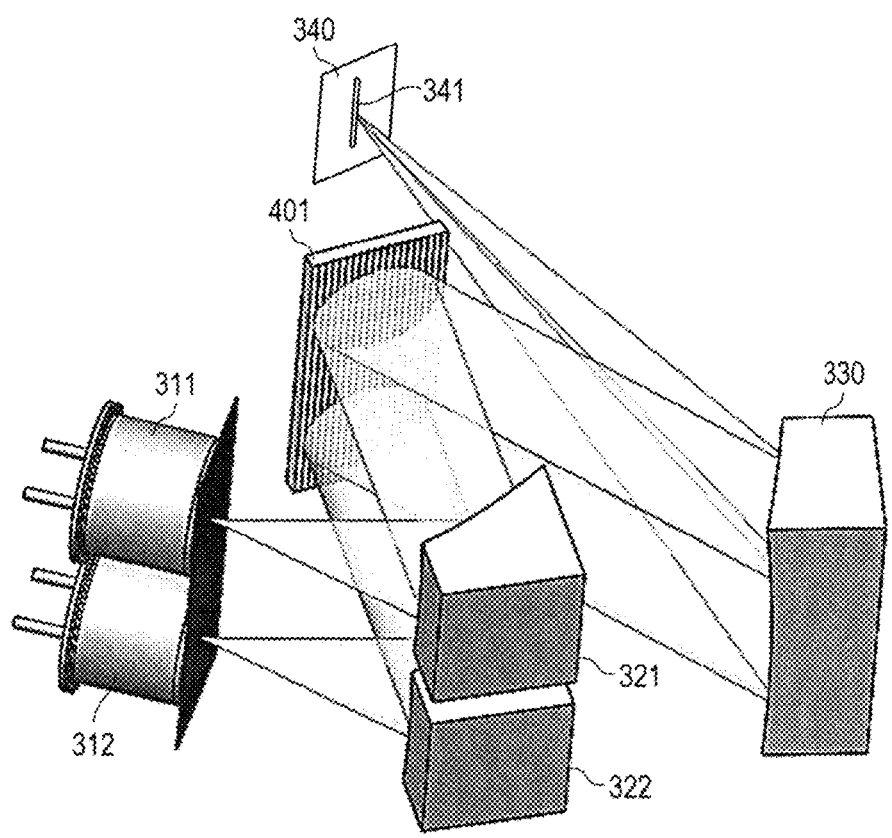
FIG. 20 is a diagram illustrating a schematic configuration of an optical system including a single-axis rotary actuator of Embodiment 2.

FIG. 20 is a diagram illustrating a schematic configuration of an optical system including a single-axis rotary actuator of this embodiment. The optical system of FIG. 20 has two light sources 311, 312 having different wavelengths from each other. Light from light source 311 is reflected by collimating mirror 321 to become parallel light, and thereafter is incident on diffraction grating 401. Similarly, light from light source 312 is reflected by collimating mirror 322 to become parallel light, and thereafter is incident on diffraction grating 401. Consequently, the light from each of two light sources 311, 312 is incident on diffraction grating 401 at the same angle of incidence. As each of collimating mirrors 321, 322, for example, an off-axis parabolic mirror may be used.

Diffraction grating 401 is rotationally driven by the single-axis rotary actuator of this embodiment described below. Emitting light from diffraction grating 401 is condensed at a position of slit 341 formed in slit part 340 by focus mirror 330. As focus mirror 330, for example, a single off-axis parabolic mirror may be used. Herein, in a case where light emitted from slit 341 is incident on a fiber, when the spread angle of a beam to be condensed is set to NA (Numerical Aperture) of the fiber or less, light of any light source can enter a single fiber, and convenience is improved.

In the optical system illustrated in FIG. 20, diffraction grating 401 is rotationally driven in the single-axis direction, so that the wavelength of the light from each of two light sources 311, 312 that reaches the slit (not illustrated) via diffraction grating 401 can be changed in accordance with the rotation angle of diffraction grating 401.

Figure 21:
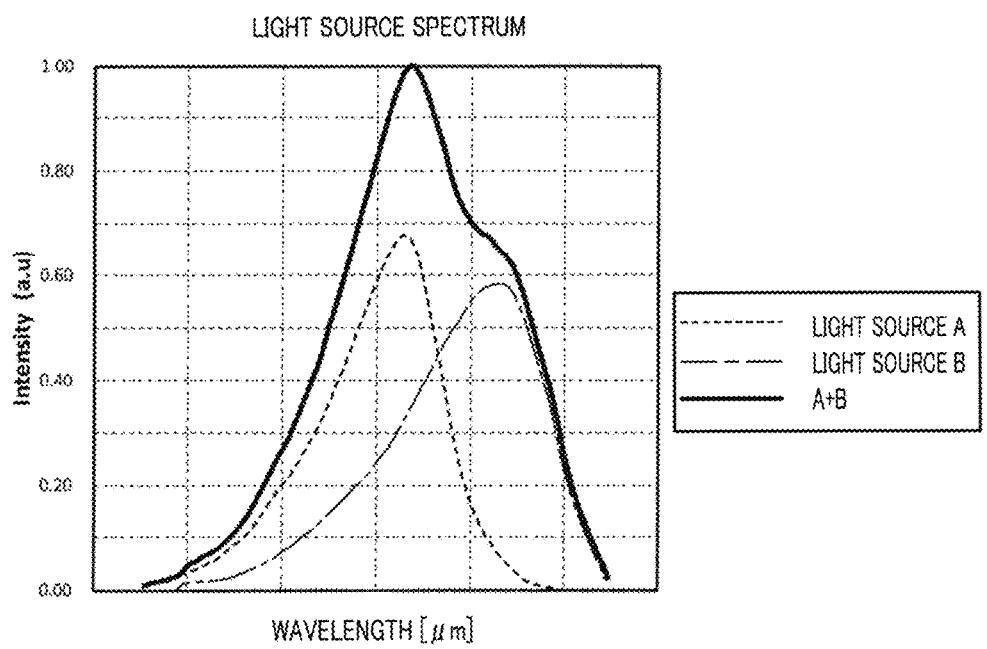
FIG. 21 is a diagram for illustrating a state in which a wavelength band is widened by using a plurality of light sources.

As illustrated in FIG. 21, in the optical system of FIG. 20, two light sources 311, 312 having different wavelengths are used, and therefore it is possible to widen a wavelength band, and the optical system can be applied to spectrometry of a wide wavelength band.

As illustrated in FIG. 21, the wavelength band of the two light sources are overlapped, so that it is possible to increase the intensity of the overlapped wavelengths, and it is possible to improve S/N.

Beams are incident on diffraction grating 401 at the same angle, and therefore the same diffraction equation indicated in the following equation is applied to two light sources 311, 312.

$$\sin \alpha \pm \sin \beta = m\lambda/p$$

Herein, $\alpha$ is the angle of incidence on diffraction grating 401, $\beta$ is the angle of emission from diffraction grating 401, m is order of diffraction, $\lambda$ is the wavelength, and p is a grating pitch of diffraction grating 401.

Figure 22:
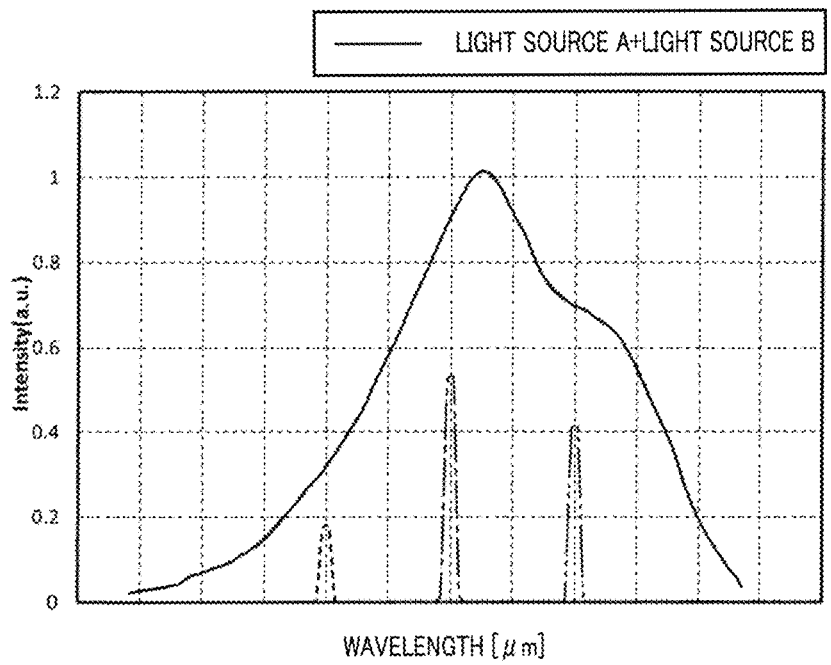
FIG. 22 is a diagram illustrating an ability to change a wavelength of light coming from a slit by rotation of a diffraction grating.

Diffraction grating 401 is rotated by single-axis rotary actuator, so that the wavelength of light emitted from slit 341 can be changed. FIG. 22 is a diagram illustrating how it takes place. When diffraction grating 401 is stopped at a predetermined angle by the single-axis rotary actuator, the wavelengths corresponding to the stop angle (three wavelengths in the example of FIG. 22) is emitted from slit 341. When diffraction grating 401 is continuously driven by the single-axis rotary actuator, a continuous spectrum can be obtained.

In the above example, two light sources 311, 312 are used. However, three or more light sources may be used. In a case where three light sources are used, three collimating mirrors, one diffraction grating, one focus mirror only need to be used. The collimating mirror and the focus mirror may be replaced with lenses. A transmission type diffraction grating may be used as diffraction grating 401. As the light source, in addition to an LED, a halogen lamp, a xenon lamp, or the like may be used. As the collimating mirror, and the focus mirror, in addition to the off-axis parabolic mirror, a spherical mirror, a toroidal mirror, an aspherical mirror, or the like can be used. Furthermore, in the above example, a pre-dispersive spectroscopy of disposing an object to be measured (cell or the like) and a photodetector behind diffraction grating 401 and slit 341 is assumed. However, in a configuration of FIG. 20, a post-dispersive spectroscopy of disposing an object to be measured (cell or the like) in front of diffraction grating 401, and installing a photodetector behind slit 341 can be used. When the photodetector is disposed behind slit 341, a photodetector of a single element can be used, and therefore it is possible to reduce a cost.

Now, a configuration of the single-axis rotary actuator of this embodiment will be described with reference to FIG. 23 to FIG. 33. In the following description, compared to single-axis rotary actuator 100 of Embodiment 1, prominently different portions of a configuration and action will be mainly described.

Figure 23:
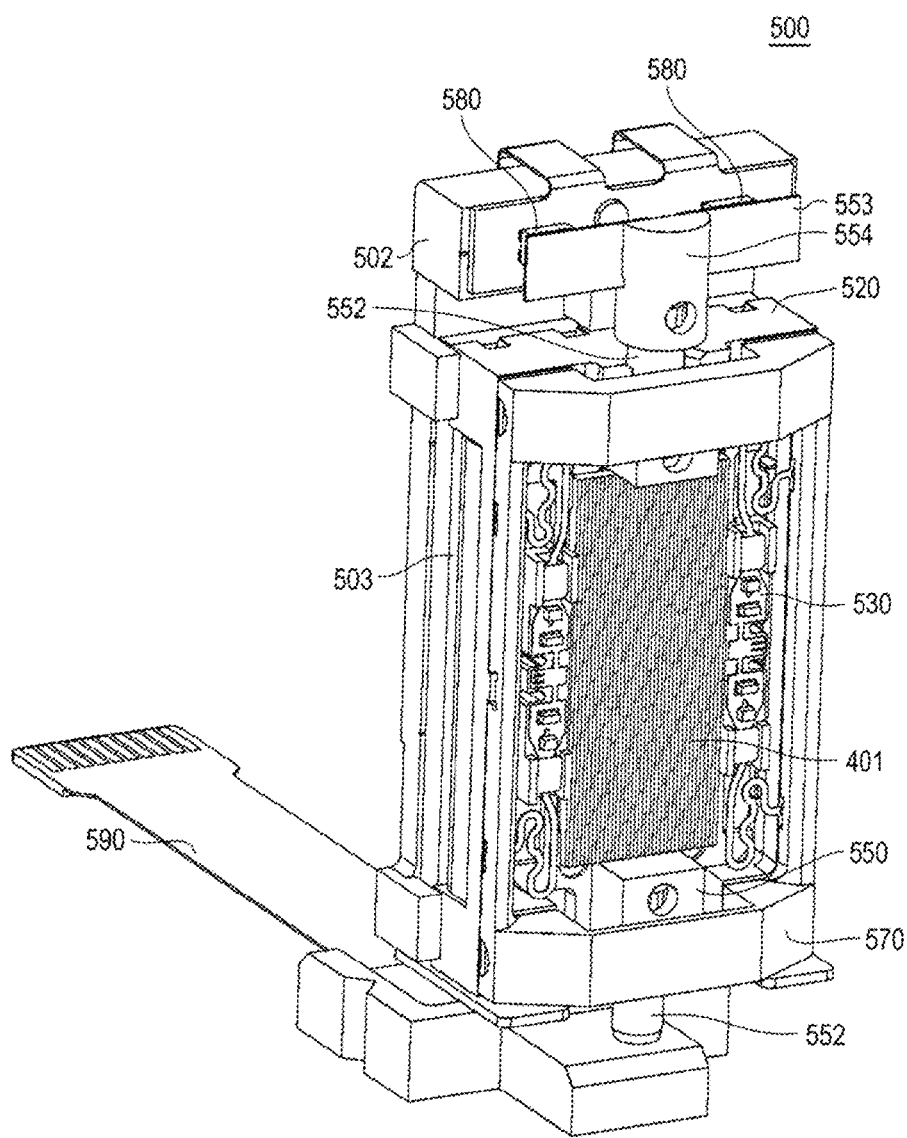
FIG. 23 is a perspective view illustrating an entire configuration of the single-axis rotary actuator according to Embodiment 2.
Figure 24:
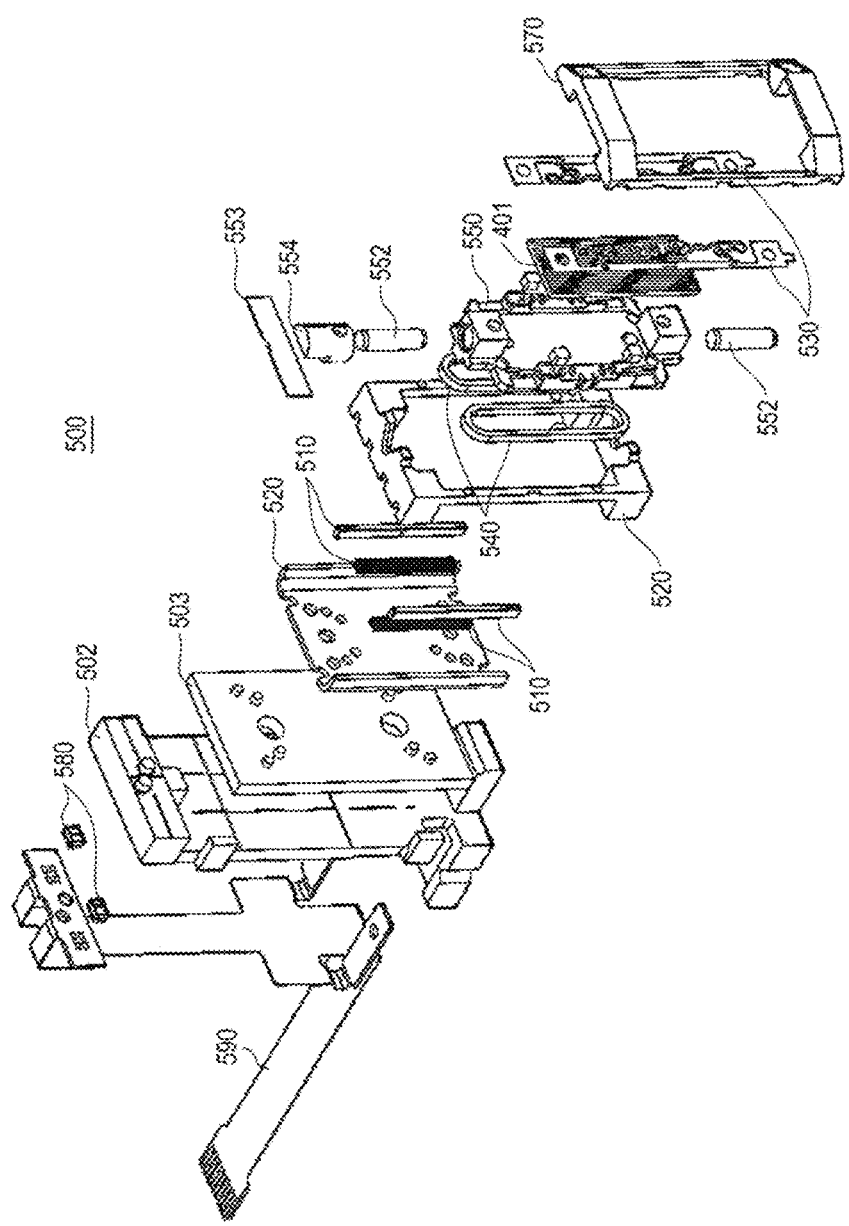
FIG. 24 is an exploded perspective view of the actuator of FIG. 23.

FIG. 23 is a perspective view illustrating an entire configuration of single-axis rotary actuator 500 (hereinafter simply referred to as an "actuator") according to Embodiment 2, and FIG. 24 is an exploded perspective view of actuator 500. Actuator 500 rotationally drives diffraction grating 401 in the single-axis direction to change the wavelength of light which reaches a slit 341 (FIG. 20) via diffraction grating 401 in accordance with the rotation angle of diffraction grating 401.

As is clear from FIG. 24, actuator 500 has fixed angle 502 (equivalent to fixed angle 2 of FIG. 2), base 503 (equivalent to base 3 of FIG. 2), magnet 510 (equivalent to magnet 10 of FIG. 2), fixing section 520 (equivalent to fixing section 20 of FIG. 2), leaf springs 530 (equivalent to leaf springs 30 of FIG. 2), coil 540 (equivalent to coil 40 of FIG. 2), holder 550 (equivalent to holder 50 of FIG. 2), cover 570 (equivalent to cover 70 of FIG. 2), photo sensor 580 (equivalent to photo sensor 80 of FIG. 1), and flexible printed wiring board 590 (equivalent to flexible printed wiring board 90 of FIG. 2).

Actuator 500 of this embodiment is greatly different from actuator 100 of Embodiment 1 in that while actuator 100 of Embodiment 1 has diffraction grating 1 that emits light incident from a single light source, actuator 500 of this embodiment has diffraction grating 401 that emits parallel lights incident from a plurality of light sources as illustrated in FIG. 20. Consequently, actuator 500 of this embodiment has a vertically long shape in the axial direction of rotary shafts as a whole, compared to actuator 100 of Embodiment 1.

Figure 25:
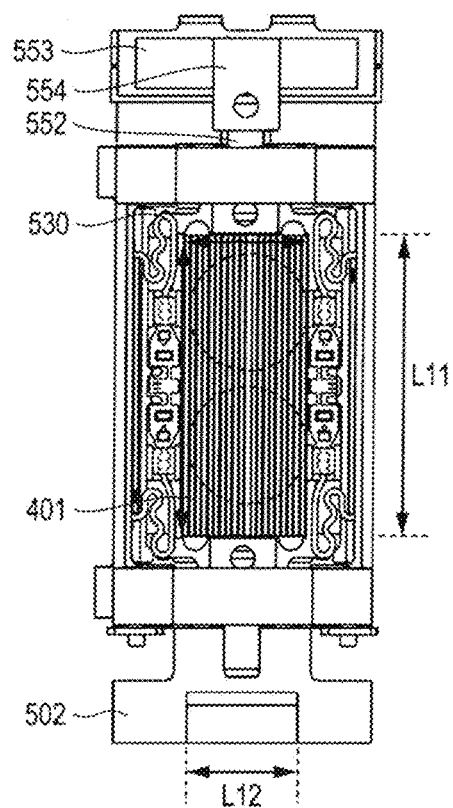
FIG. 25 is a diagram illustrating a state of light incident on the diffraction grating of Embodiment 2.
Figure 26:
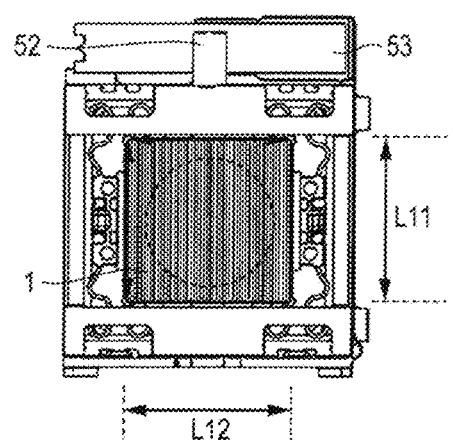
FIG. 26 is a diagram illustrating a state of light incident on the diffraction grating of Embodiment 1.

FIG. 25 illustrates a state of light incident on diffraction grating 401 of actuator 500 of this embodiment. Additionally, FIG. 26 illustrates a state of light incident on diffraction grating 1 of actuator 100 of Embodiment 1. A portion illustrated by a circle in the drawings illustrates light incident on each of diffraction gratings 401, 1. Both diffraction gratings 401, 1 are mounted such that the grating grooves of diffraction gratings 401, 1 are parallel to the axis directions of the rotary shafts. Herein, the axial direction of the rotary shafts, that is, the direction parallel to the grating grooves of each of diffraction grating 401, 1 is referred to the longitudinal direction, and the direction orthogonal to this is referred to the cross direction.

Diffraction grating 1 of Embodiment 1 illustrated in FIG. 26 only needs to take charge of the single light source, and therefore length L11 in the longitudinal direction of diffraction grating 1 is substantially equal to length L12 in the cross direction. On the other hand, diffraction grating 401 of this embodiment illustrated in FIG. 25 takes charge of the two light sources, and therefore length L11 in the longitudinal direction of diffraction grating 401 is longer than length L12 in the cross direction. Actually, length L11 in the longitudinal direction of diffraction grating 401 is at least twice length L12 in the cross direction. Consequently, diffraction grating 401 can emit parallel lights incident from the two light source. By a similar way of thinking, in a case where N light sources are provided, length L11 in the longitudinal direction of diffraction grating 401 only needs to be set to at least N times length L12 in the cross direction.

When it is considered that the light sources are disposed so as to be aligned in the cross direction of the diffraction grating, it is considered that the diffraction grating is configured to be long in the cross direction. However, in this embodiment, the light sources are not aligned in the cross direction, but aligned in the longitudinal direction. Thus, an optical path difference by rotation of diffraction grating 401 is not generated between the light sources, and therefore an optical system having a similar configuration can be used between the light sources.

As the diffraction grating, rectangular diffraction grating 401 having long sides parallel to the axial direction of the rotary shafts, and short sides perpendicular to the axial direction of the rotary shafts. However, the shape of the diffraction grating is not always limited to a rectangular shape. In short, the diffraction grating only needs to have a shape in which a plurality of light sources are arranged in the direction parallel to the axial direction of the rotary shafts, that is, the grating grooves of diffraction grating 401. However, when length L12 in the cross direction is uselessly increased, the size of the apparatus is increased, and therefore diffraction grating 401 is preferably oblong in the direction parallel to the axial direction of the rotary shafts, that is, the grating grooves of diffraction grating 401.

Figure 27:
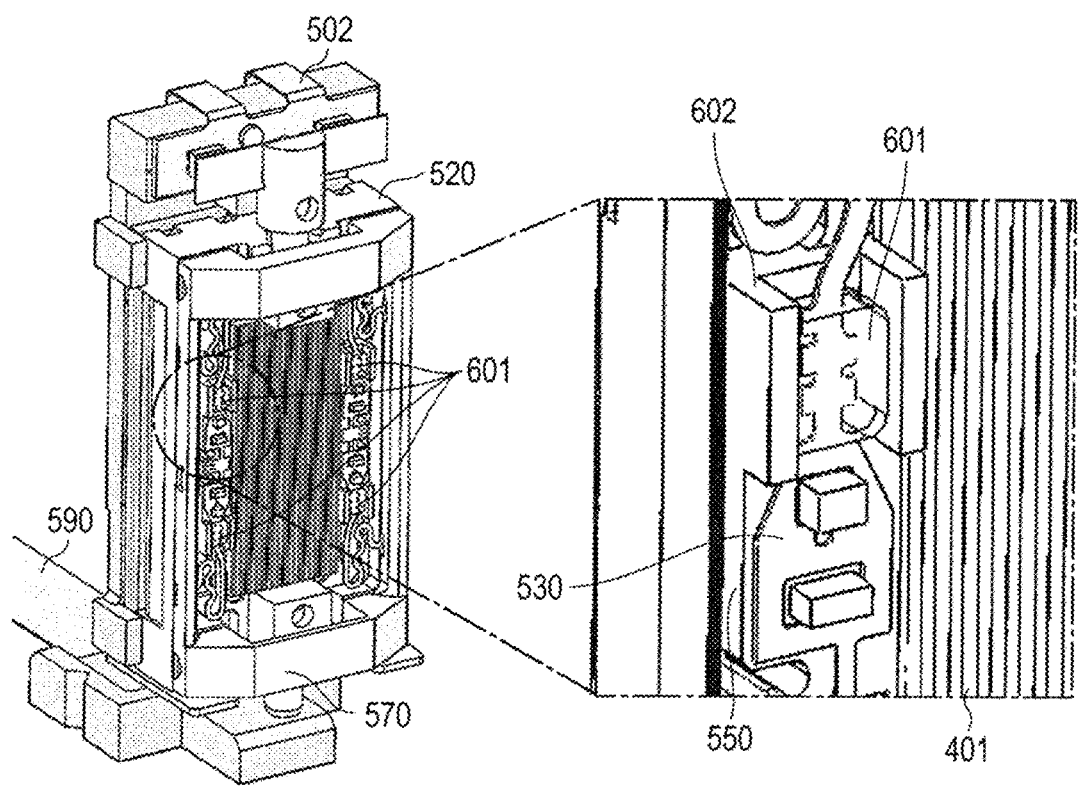
FIG. 27 is a diagram illustrating a state of gel provided as a buffer member that suppresses vibration of a leaf spring.

In addition to the above configuration, as illustrated in FIG. 27, in leaf springs 530 of actuator 500, gels 601 as buffer members suppressing vibration of leaf springs 530 are provided. Consequently, it is possible to shorten the ringing time. As a result, it is possible to shorten measurement time. The measurement time can be represented by the following equation.

measurement time=(ringing convergence time+time during which a predetermined angle is maintained)×the number of measurement points Actually, gels 601 may be provided to fill gel pods 602 by forming such gel pods 602 having recessed cross sections in holder 550. In the example of FIG. 27, gels 601 are provided in the vicinities of four portions where leaf springs 530 are mounted. Thus, gels 601 are disposed in the vicinity of roots of leaf springs 530 having relatively small displacement, and it is possible to lower a possibility that gels 601 are peeled from leaf springs 530. However, the positions where gels 601 are disposed are not limited to this. In short, gels 601 only needs to be disposed at a position at which ringing of leaf springs 530 can be reduced.

Figure 28A:
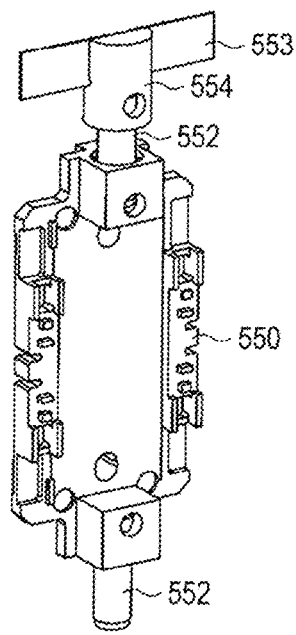
FIGS. 28A and 28B each is a diagram illustrating a mounting structure of rotary shafts according to Embodiment 2.
Figure 28B:
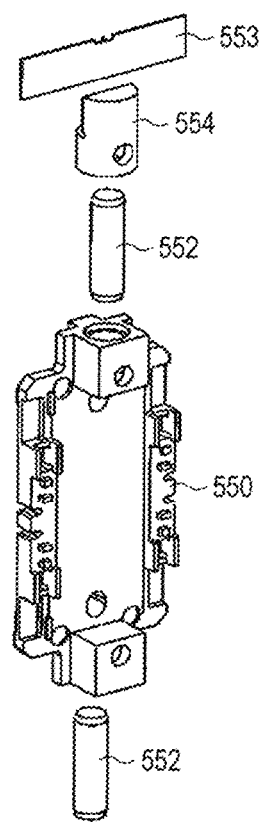

FIGS. 28A and 28B each illustrates a mounting structure of the rotary shafts according to this embodiment. FIG. 28A illustrates a state in which rotary shafts 552 are mounted on holder 550, and FIG. 28B illustrates a state before rotary shafts 552 are mounted on holder 550. As illustrated in FIGS. 28A and 28B, in this embodiment, holder 550 and rotary shafts 552 are separately constituted, and rotary shafts 552 are mounted on holder 550. Consequently, holder 550 can be accurately rotated. Holder 550 is formed of, for example, polycarbonate resin, and rotary shafts 552 are formed of, for example, metal. Reflector 553 is mounted on one of rotary shafts 552 by cap 554.

Figure 30:
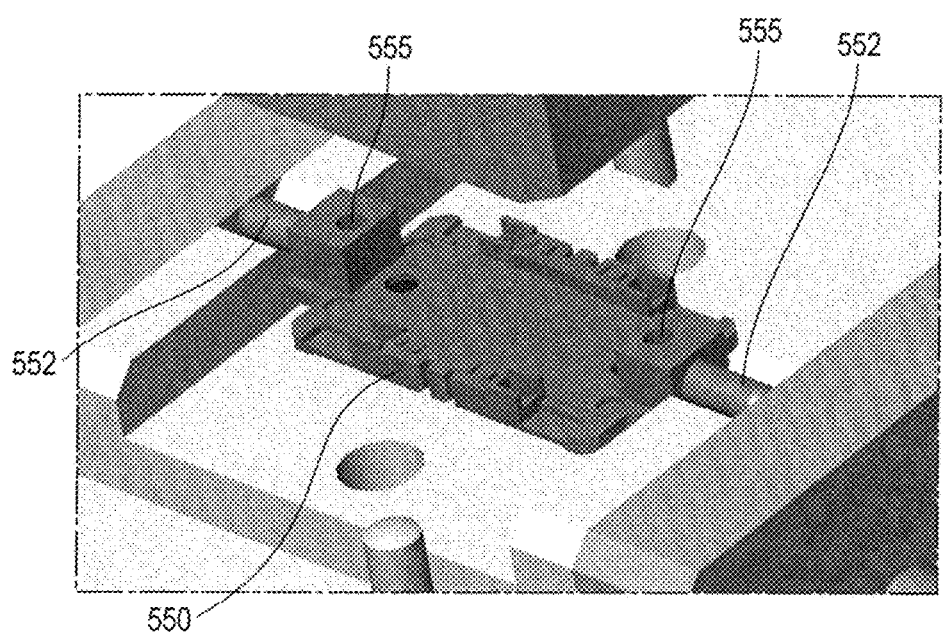
FIG. 30 is a diagram for illustrating how the rotary shafts are mounted to the holder.

Herein, in order to integrally mold desired rotary shafts 52 on the both sides of holder 50 like Embodiment 1, a high manufacturing technology is required. As illustrated in FIG. 29A, as a result of molding, when rotary shafts 52 are off axis, there is an inconvenient that one of rotary shafts 52 is out of bearing 21a as illustrated in FIG. 29B, or one of rotary shafts 52 rotates while swinging in bearing 21a as illustrated in FIG. 29C. Like this embodiment, when holder 550 and rotary shafts 552 are separately constituted, and rotary shafts 552 are mounted on holder 550 based on a jig, it is possible to prevent the inconvenience due to off-axis illustrated in FIGS. 29A to 29C. When rotary shafts 552 are mounted on holder 550, as illustrated in FIG. 30, rotary shafts 552 are inserted on the both sides in the longitudinal direction of holder 550, and thereafter resin is made to flow from injected holes 555, and rotary shafts 552 are fixed to holder 550. Herein, when the diameters of holes of holder 550 for inserting rotary shafts 552 are set to sizes having slight margins at the time of insertion of rotary shafts 552, positions of rotary shafts 552 are adjusted while a jig is used, and rotary shafts 552 are fixed to holder 550, rotary shafts 552 can be mounted at desired positions on axis.

Figure 31:
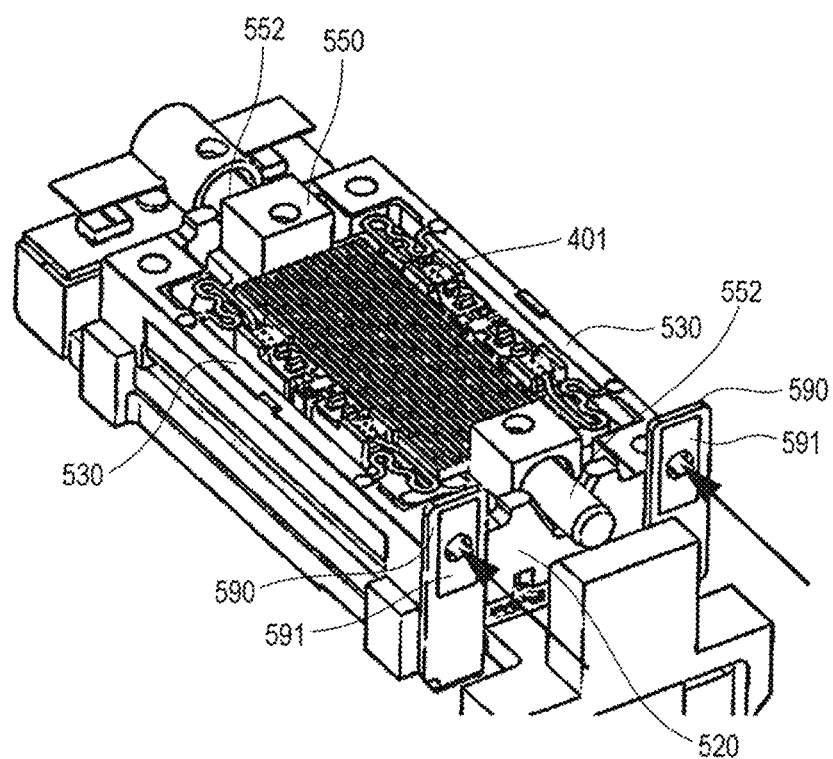
FIG. 31 is a diagram illustrating a state of electric connection of leaf springs to flexible printed wiring boards, according to Embodiment 2.

FIG. 31 illustrates a state of electric connection of leaf springs 530 to flexible printed wiring boards 590. As described in Embodiment 1, power is supplied from flexible printed wiring boards 590 to coil 540 through leaf springs 530. Accordingly, flexible printed wiring boards 590 and leaf springs 530 need to be electrically connected. In this embodiment, wall parts 591 are formed by protruding one parts of flexible printed wiring boards 590 with respect to placing surfaces of holder 550, the placing surfaces allowing leaf springs 530 to be placed, one ends of leaf springs 530 are inserted into connection holes formed in wall parts 591, and soldering is performed from the outside of wall parts 591 in this state as illustrated by arrows, so that flexible printed wiring boards 590 and leaf springs 530 are electrically connected. Consequently, it is possible to prevent scattering of solder flux to leaf springs 530, and to prevent malfunction of leaf springs 530 by adhesion of the scattered flux.

A spring constant of leaf springs 530 is increased, so that current sensitivity of actuator 500 is preferably dulled. In other words, when the spring constant of leaf springs 530 is increased, an angle error of actuator 500 to an error of a VCM driver can be dulled (in other word, current sensitivity can be lowered). For example, in case where the actuator is used as a spectroscope, it is possible to secure necessary wavelength accuracy.

Figure 32:
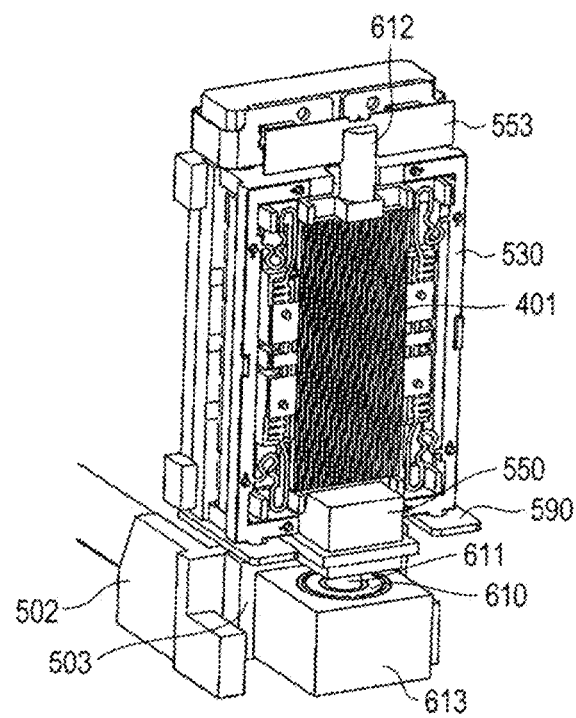
FIG. 32 is a perspective view illustrating a cantilever structure including a ball bearing.
Figure 33:
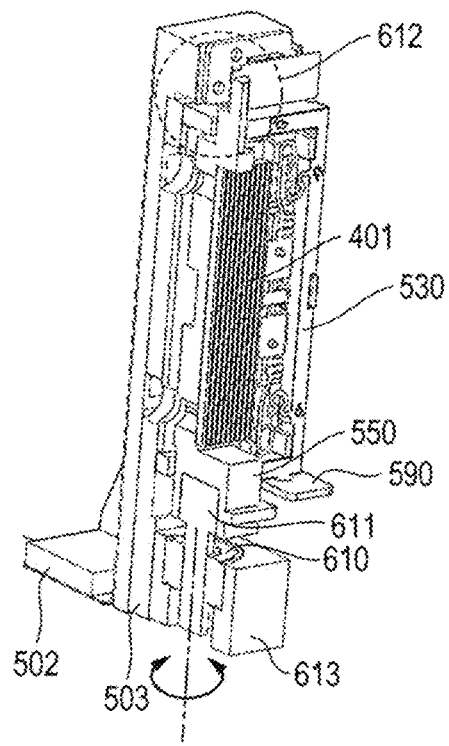
FIG. 33 is a partial sectional view illustrating the cantilever structure including a ball bearing.

In place of rotary shafts 52, 552, a cantilever structure by a ball bearing may be employed. FIG. 32 and FIG. 33 each illustrate a state thereof. An end in the longitudinal direction of holder 550 is provided with rotary shaft 611, rotary shaft 611 is pivotally supported by ball bearing 610 installed on housing 613 provided in base 503 so as to be rotatable. In this case, shaft 612 formed in the other end of holder 550 does not function as a shaft for supporting holder 550, but functions as a shaft for moving reflector 553. Thus, with a structure in which ball bearing 610 is used, it is possible to reduce frictional force by rotation, and to reduce backlash of the rotary shaft.

As described above, according to this embodiment, the shape of diffraction grating 401 is formed such that the length in the axial direction of rotary shafts 552 is longer than the length in the direction orthogonal to the axial direction of rotary shafts 552, so that there may be provided single-axis rotary actuator 500 suitable for forming wide light in a wavelength band.

As described in Embodiment 1, the optical device mounted on holder 550 is not limited to diffraction grating 401. For example, a mirror or the like may be mounted. Actuator 500 of the above embodiment can be used as, for example, an actuator for a spectroscope, or an actuator for a rotation mechanism or the like for changing light distribution of a headlight for a vehicle.

The configuration described in this embodiment can be applied also to actuator 100 of Embodiment 1. In other words, the configuration of Embodiment 1, and the configuration of Embodiment 2 can be used by complex combination.

The above embodiments merely exemplify a specific example when the present invention is implemented, and the technical scope of the present invention should not be restrictively interpreted by these embodiments. In other words, the present invention can be implemented in various forms without departing from the scope or essential characteristics.

This application is entitled to and claims the benefit of Japanese Patent Application No. 2016-075893 dated Apr. 5, 2016, the disclosure of which including the specification, drawings and abstract is incorporated herein by reference in its entirety.

INDUSTRIAL APPLICABILITY

A single-axis rotary actuator of the present invention can be used as, for example, an actuator that rotationally drives a diffraction grating of a spectroscope.

REFERENCE SIGNS LIST 1, 401 diffraction grating
10, 11, 12, 13, 14, 510 magnet
20, 520 fixing section
21 frame body
21a bearing
22, 122, 222-1, 222-2 yoke
30, 530 leaf spring
31 outer circumferential part
32 inner circumferential part
33 arm section
40, 41, 42, 140, 540 air core coil
40a, 40b terminal
50, 550 holder
51 holder body
52, 552 rotary shaft
53, 553 reflector
54, 55 projection
60 spacer
70, 570 cover
80, 180, 580 photo sensor
90, 590 flexible printed wiring board
100, 500 actuator
152 fulcrum member
200 spectroscope
311, 312 light source
321, 322 collimating mirror
330 focus mirror
341 slit

The invention claimed is:
1. A single-axis rotary actuator comprising:
a holder including a placing surface for mounting an optical device thereon, and an insertion part for inserting a rotary shaft;
a base including a ball bearing that rotatably supports the rotary shaft; an elastic member that is disposed to connect between the base and the holder and that urges the holder to restore its position to a neutral position;

a driving section that comprises a magnet and a coil separately provided to the holder and the base and that is configured to rotate the holder around the rotary shaft.

* * * * *